US008560328B2

(12) United States Patent
Yamanashi et al.

(10) Patent No.: US 8,560,328 B2
(45) Date of Patent: Oct. 15, 2013

(54) ENCODING DEVICE, DECODING DEVICE, AND METHOD THEREOF

(75) Inventors: Tomofumi Yamanashi, Kanagawa (JP); Masahiro Oshikiri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1163 days.

(21) Appl. No.: 12/518,371

(22) PCT Filed: Dec. 14, 2007

(86) PCT No.: PCT/JP2007/074141
§ 371 (c)(1),
(2), (4) Date: Jun. 9, 2009

(87) PCT Pub. No.: WO2008/072737
PCT Pub. Date: Jun. 19, 2008

(65) Prior Publication Data
US 2010/0017198 A1 Jan. 21, 2010

(30) Foreign Application Priority Data
Dec. 15, 2006 (JP) ................................ 2006-338341
Mar. 2, 2007 (JP) ................................ 2007-053496

(51) Int. Cl.
*G10L 19/00* (2013.01)
*G10L 11/04* (2006.01)
*G01L 11/06* (2006.01)
*G10L 15/20* (2006.01)
*G10L 21/04* (2013.01)

(52) U.S. Cl.
USPC ........... 704/500; 704/222; 704/230; 704/219; 704/220; 704/221; 704/207; 704/214; 704/200.1; 704/233; 704/501; 704/502; 704/503; 704/504

(58) Field of Classification Search
USPC ......... 704/222, 230, 219, 220, 221, 207, 214, 704/200.1, 233, 500–504
See application file for complete search history.

(56) References Cited

U.S. PATENT DOCUMENTS 5,581,652 A * 12/1996 Abe et al. ...................... 704/222
5,752,222 A * 5/1998 Nishiguchi et al. ........... 704/201
(Continued)

FOREIGN PATENT DOCUMENTS

CN 1527995 9/2004
WO 2005/112001 11/2005
(Continued)

OTHER PUBLICATIONS

Oshikiri et al., "Efficient Spectrum Coding for Super-Wideband Speech and Its Application to 7/10/15KHZ Bandwidth Scalable Coders", Proc IEEE Int Conf Acoust Speech Signal Process, 2004, vol. 1, pp. 481-484, 2004.

(Continued)

*Primary Examiner* — Edgar Guerra-Erazo
(74) *Attorney, Agent, or Firm* — Greenblum & Bernstein, P.L.C.

(57) ABSTRACT

A decoding device is capable of flexibly calculating high-band spectrum data with a high accuracy in accordance with an encoding band selected by an upper-node layer of the encoding side. In this device: a first layer decoder decodes first layer encoded information to generate a first layer decoded signal; a second layer decoder decodes second layer encoded information to generate a second layer decoded signal; a spectrum decoder performs a band extension process by using the second layer decoded signal and the first layer decoded signal up-sampled in an up-sampler so as to generate an all-band decoded signal; and a switch outputs the first layer decoded signal or the all-band decoded signal according to the control information generated in a controller.

17 Claims, 17 Drawing Sheets

(56) References Cited

U.S. PATENT DOCUMENTS

| | | | | |
|---|---|---|---|---|
| 5,752,225 | A * | 5/1998 | Fielder | 704/229 |
| 5,774,835 | A * | 6/1998 | Ozawa | 704/205 |
| 6,064,698 | A * | 5/2000 | Koike | 375/242 |
| 6,865,534 | B1 * | 3/2005 | Murashima et al. | 704/262 |
| 6,988,065 | B1 | 1/2006 | Yasunaga et al. | |
| 7,139,702 | B2 | 11/2006 | Tsushima et al. | |
| 7,177,802 | B2 | 2/2007 | Sato et al. | |
| 8,370,138 | B2 * | 2/2013 | Kawashima et al. | 704/229 |
| 8,380,526 | B2 * | 2/2013 | Hu et al. | 704/500 |
| 8,428,956 | B2 * | 4/2013 | Yoshida | 704/500 |
| 2002/0152085 | A1 * | 10/2002 | Tsushima et al. | 704/500 |
| 2003/0093271 | A1 * | 5/2003 | Tsushima et al. | 704/230 |
| 2003/0206558 | A1 * | 11/2003 | Parkkinen et al. | 370/477 |
| 2006/0235678 | A1 * | 10/2006 | Kim et al. | 704/200.1 |
| 2006/0251178 | A1 * | 11/2006 | Oshikiri | 375/242 |
| 2006/0287853 | A1 | 12/2006 | Tsushima et al. | |
| 2007/0250310 | A1 * | 10/2007 | Sato et al. | 704/219 |
| 2007/0253481 | A1 | 11/2007 | Oshikiri | |
| 2008/0052066 | A1 | 2/2008 | Oshikiri et al. | |
| 2008/0059154 | A1 * | 3/2008 | Ramo et al. | 704/200.1 |
| 2008/0065373 | A1 | 3/2008 | Oshikiri | |
| 2008/0091440 | A1 | 4/2008 | Oshikiri | |
| 2010/0017204 | A1 * | 1/2010 | Oshikiri et al. | 704/222 |
| 2010/0280834 | A1 | 11/2010 | Tsushima et al. | |
| 2012/0136670 | A1 * | 5/2012 | Ishikawa et al. | 704/500 |

FOREIGN PATENT DOCUMENTS

| | | |
|---|---|---|
| WO | 2006/049204 | 5/2006 |
| WO | 2006/049205 | 5/2006 |

OTHER PUBLICATIONS

Fuchs Guillaume et al., "A Scalable CELP/Transform Coder for Low Bit Rate Speech and Audio Coding", AES Convention 120; May 2006, AES, 60 East 42nd Street, Room 2520 New York 10165-2520, USA, XP040507696, May 1, 2006.

Bernd Geiser et al., "A Qualified ITU-TG. 729EV Codec Candidate for Hierarchical Speech and Audio Coding", 2006 IEEE 8th, XP031011031 Workshop on Multimedia Signal Processing, MMSP'06, Victoria, Canada, Oct. 1, 2006, pp. 114-118.

Search report from E.P.O., mail date is Jul. 29, 2011.

Kataoka et al., "G.729 o Kosei Yoso to shite Mochiiru Scalable Kotaiiki Onsei Fugoka," The Transactions of the Institute of Electronics, Information and Communication Engineers D-II, Mar. 1, 2003, vol. J86-D-II, No. 3, pp. 379-387.

Oshikiri et al., "AMR o Core ni shita Kyotaiiki/Kotaiiki Scalable Onsei Fugoka Hoshiki," The Acoustical Society of Japan (ASJ) Koen Ronbunshu CD-ROM, Mar. 7, 2006, 1-Q-28, pp. 389-390.

Oshikiri et al., "Improvement of the super-wideband scalable coder using pitch filtering based spectrum coding," Annual Meeting of Acoustic Society of Japan Feb. 4, 2013, pp. 297-298, Sep. 2004.

Oshikiri et al., "A Scalable coder designed for 10-kHz Bandwidth speech", 2002 IEEE Speech Coding Workshop. Proceedings, pp. 111-113.

Oshikiri et al., "A 10 kHz bandwidth scalable codec using adaptive selection VQ of time-frequency coefficients", Forum on Information Technology, vol. FIT 2003, No. , pp. 239-240, vol. 2, Aug. 25, 2003, along with an English language translation thereof.

Oshikiri et al., "Efficient Spectrum Coding for Super-Wideband Speech and Its Application to 7/10/15kHz Bandwidth Scalable Coders", Proc IEEE Int Conf Acoust Speech Signal Process, vol. 2004, No. vol. 1, pp. I.481-I484, 2004.

Oshikiri et al., "A 7/10/15kHz Bandwidth scalable coder using pitch filtering based spectrum coding", The Acoustical Society of Japan, Research Committee Meeting, lecture thesis collection, vol. 2004, No., pp. 327-328 Spring 1, Mar. 17, 2004, along with an English language translation thereof.

Oshikiri et al., "Improvement of the super-wideband scalable coder using pitch filtering based spectrum coding", The Acoustical Society of Japan, Research Committee Meeting, lecture thesis collection , vol. 2004, No., pp. 297-298 Autumn 1, Sep. 21, 2004, along with an English language translation thereof.

Oshikiri et al., "Study on a low-delay MDCT analysis window for a scalable speech coder", The Acoustical Society of Japan, Research Committee Meeting, lecture thesis collection, vol. 2005, No., pp. 203-204 Spring 1, Mar. 8, 2005, along with an English language translation thereof.

Oshikiri et al., "A 7/10/15kHz Bandwidth Scalable Speeds Coder Using Pitch Filtering Based Spectrum Coding", IEICE D, vol. J89-D, No. 2, pp. 281-291, Feb. 1, 2006, along with an English language translation thereof.

S.A. Ramprashad, "A two stage hybrid embedded speech/audio coding structure", Proc. IEEE ICASSP '98, pp. 337-340, May 1998.

B. Kovesi et al., "A scalable speech and audio coding scheme with continuous bitrate flexibility", Proc. IEEE ICASSP 2004, pp. I-273-I-276, May 2004.

J.Sung-Kyo et al., "A bit-rate/bandwidth scalable speech coder based on ITU-T G. 723. 1 standard", Proc. IEEE ICASSP 2004, pp. I-285-I-288, May 2004.

M. Dietz et al., "Spectral band replication, a novel approach in audio coding", The 112$^{th}$ Audio Engineering Society Convention, Paper 5553, May 2002.

Oshikiri, "Research on variable bit rate high efficiency speech coding focused on speech spectrum", Doctoral thesis, Tokai University, Mar. 24, 2006, along with an English language translation thereof.

Kami, A et al., "Scalable Audio Coding Based on Hierarchical Transform Coding Modules", IEICE vol. J83-A, No. 3, pp. 241-252, Mar. 2000, along with an English language translation thereof.

B. Grill, "A bit rate scalable perceptual coder for MPEG-4 audio", The 103$^{rd}$ Audio Engineering Society Convention, Preprint 4620, Sep. 1997.

Oshikiri et al., "A narrowband/wideband scalable speech coder using AMR coder as a core-layer", The Acoustical Society of Japan, Research Committee Meeting, lecture thesis collection (CD-ROM), vol. 2006, No., pp. 1-Q-28 Spring, Mar. 7, 2006, along with an English language translation thereof.

K-T. Kim et al., "A new bandwidth scalable wideband speech/audio coder", Proceedings of IEEE International Conference on Acoustics, Speech and Signal Proceeding 2002 (ICASSP-2002), pp. I-657-I-660.

B. Geiser et al., "A qualified ITU-T G. 729EV codec candidate for hierarchical speech and audio coding", Proceeding of IEEE 8$^{th}$ Workshop on Multimedia Signal Proceeding, pp. 114-118 (Oct. 3, 2006).

S, Ragot et al., "A 8-32 kbit/s scalable wideband speech and audio coding candidate for ITU-T G729EV standardization", Proceeding of IEEE international Conference on Acoustics Speech and Signal Processing 2006 (ICASSP-2006), pp. I-1-I-4 (May 14, 2006).

ITU-T, "G. 729 based embedded rariable bit-rate coder: An 8-32 kbit/s scalable wideband coder bit-stream interoperable with G. 729", ITU-T Recommendation G. 729.1 (2006).

Miki Sukeichi, "Everything for MPEG-4 (first edition)", Kogyo Chosakai Publishing, Inc., Sep. 30, 1998, pp. 126-127, along with an English language translation thereof.

China Office action, mail date is Mar. 24, 2011.

* cited by examiner

300

ENCODING DEVICE, DECODING DEVICE, AND METHOD THEREOF

TECHNICAL FIELD

The present invention relates to an encoding apparatus, decoding apparatus, and method thereof used in a communication system in which a signal is encoded and transmitted.

BACKGROUND ART

When a speech/audio signal is transmitted in a packet communication system typified by Internet communication, a mobile communication system, or the like, compression/encoding technology is often used in order to increase speech/audio signal transmission efficiency. Also, there has been a growing need in recent years for a technology for encoding a wider-band speech/audio signal as opposed to simply encoding a speech/audio signal at a low bit rate.

In response to this need, various technologies have been developed for encoding a wideband speech/audio signal without increasing the post-encoding information amount. For example, Non-patent Document 1 presents a method whereby an input signal is transformed to a frequency-domain component, a parameter is calculated that generates high-band spectrum data from low-band spectrum data using a correlation between low-band spectrum data and high-band spectrum data, and band enhancement is performed using that parameter at the time of decoding.

Non-patent Document 1: Masahiro Oshikiri, Hiroyuki Ehara, Koji Yoshida, "Improvement of the super-wideband scalable coder using pitch filtering based spectrum coding", Annual Meeting of Acoustic Society of Japan 2-4-13, pp. 297-298, September 2004

DISCLOSURE OF INVENTION

Problems to be Solved by the Invention

However, with conventional band enhancement technology, spectrum data of a high-band of a frequency obtained by band enhancement in a lower layer is used directly in an upper layer on the decoding side, and therefore sufficiently accurate high-band spectrum data cannot be said to be reproduced.

It is an object of the present invention to provide an encoding apparatus, decoding apparatus, and method thereof capable of calculating highly accurate high-band spectrum data using low-band spectrum data on the decoding side, and capable of obtaining a higher-quality decoded signal.

Means for Solving the Problems

An encoding apparatus of the present invention employs a configuration having: a first encoding section that encodes part of a low band that is a band lower than a predetermined frequency within an input signal to generate first encoded data; a first decoding section that decodes the first encoded data to generate a first decoded signal; a second encoding section that encodes a predetermined band part of a residual signal of the input signal and the first decoded signal to generate second encoded data; and a filtering section that filters part of the low band of one or another of the input signal, the first decoded signal, and a calculated signal calculated using the first decoded signal, to obtain a pitch coefficient and filtering coefficient for obtaining part of a high band that is a band higher than the predetermined frequency of the input signal.

A decoding apparatus of the present invention uses a scalable codec with an r-layer configuration (where r is an integer of 2 or more), and employs a configuration having: a receiving section that receives a band enhancement parameter calculated using an m'th-layer decoded signal (where m is an integer less than or equal to r) in an encoding apparatus; and a decoding section that generates a high-band component by using the band enhancement parameter on a low-band component of an n'th-layer decoded signal (where n is an integer less than or equal to r).

A decoding apparatus of the present invention employs a configuration having: a receiving section that receives, transmitted from an encoding apparatus, first encoded data in which is encoded part of a low band that is a band lower than a predetermined frequency within an input signal in the encoding apparatus, second encoded data in which is encoded a predetermined band part of a residue of a first decoded spectrum obtained by decoding the first encoded data and a spectrum of the input signal, and a pitch coefficient and filtering coefficient for obtaining part of a high band that is a band higher than the predetermined frequency of the input signal by filtering part of the low band of one or another of the input signal, the first decoded spectrum, and a first added spectrum resulting from adding together the first decoded spectrum and a second decoded spectrum obtained by decoding the second encoded data; a first decoding section that decodes the first encoded data to generate a third decoded spectrum in the low band; a second decoding section that decodes the second encoded data to generate a fourth decoded spectrum in the predetermined band part; and a third decoding section that decodes a band part not decoded by the first decoding section or the second decoding section by performing band enhancement of one or another of the third decoded spectrum, the fourth decoded spectrum, and a fifth decoded spectrum generated using both of these, using the pitch coefficient and filtering coefficient.

An encoding method of the present invention has: a first encoding step of encoding part of a low band that is a band lower than a predetermined frequency within an input signal to generate first encoded data; a decoding step of decoding the first encoded data to generate a first decoded signal; a second encoding step of encoding a predetermined band part of a residual signal of the input signal and the first decoded signal to generate second encoded data; and a filtering step of filtering part of the low band of one or another of the input signal, the first decoded signal, and a calculated signal calculated using the first decoded signal, to obtain a pitch coefficient and filtering coefficient for obtaining part of a high band that is a band higher than the predetermined frequency of the input signal.

A decoding method of the present invention uses a scalable codec with an r-layer configuration (where r is an integer of 2 or more), and has: a receiving step of receiving a band enhancement parameter calculated using an m'th-layer decoded signal (where m is an integer less than or equal to r) in an encoding apparatus; and a decoding step of generating a high-band component by using the band enhancement parameter on a low-band component of an n'th-layer decoded signal (where n is an integer less than or equal to r).

A decoding method of the present invention has: a receiving step of receiving, transmitted from an encoding apparatus, first encoded data in which is encoded part of a low band that is a band lower than a predetermined frequency within an input signal in the encoding apparatus, second encoded data in which is encoded a predetermined band part of a residue of a first decoded spectrum obtained by decoding the first encoded data and a spectrum of the input signal, and a pitch coefficient and filtering coefficient for obtaining part of a high band that is a band higher than the predetermined frequency of the input signal by filtering part of the low band of one or another of the input signal, the first decoded spectrum, and a first added spectrum resulting from adding together the first decoded spectrum and a second decoded spectrum obtained by decoding the second encoded data; a first decoding step of decoding the first encoded data to generate a third decoded spectrum in the low band; a second decoding step of decoding the second encoded data to generate a fourth decoded spectrum in the predetermined band part; and a third decoding step of decoding a band part not decoded by the first decoding step or the second decoding step by performing band enhancement of one or another of the third decoded spectrum, the fourth decoded spectrum, and a fifth decoded spectrum generated using both of these, using the pitch coefficient and filtering coefficient.

Advantageous Effect of the Invention

According to the present invention, by selecting an encoding band in an upper layer on the encoding side, performing band enhancement on the decoding side, and decoding a component of a band that could not be decoded in a lower layer or upper layer, highly accurate high-band spectrum data can be calculated flexibly according to an encoding band selected in an upper layer on the encoding side, and a better-quality decoded signal can be obtained.

BEST MODE FOR CARRYING OUT THE INVENTION

Embodiments of the present invention will now be described in detail with reference to the accompanying drawings.

Embodiment 1

Figure 1:
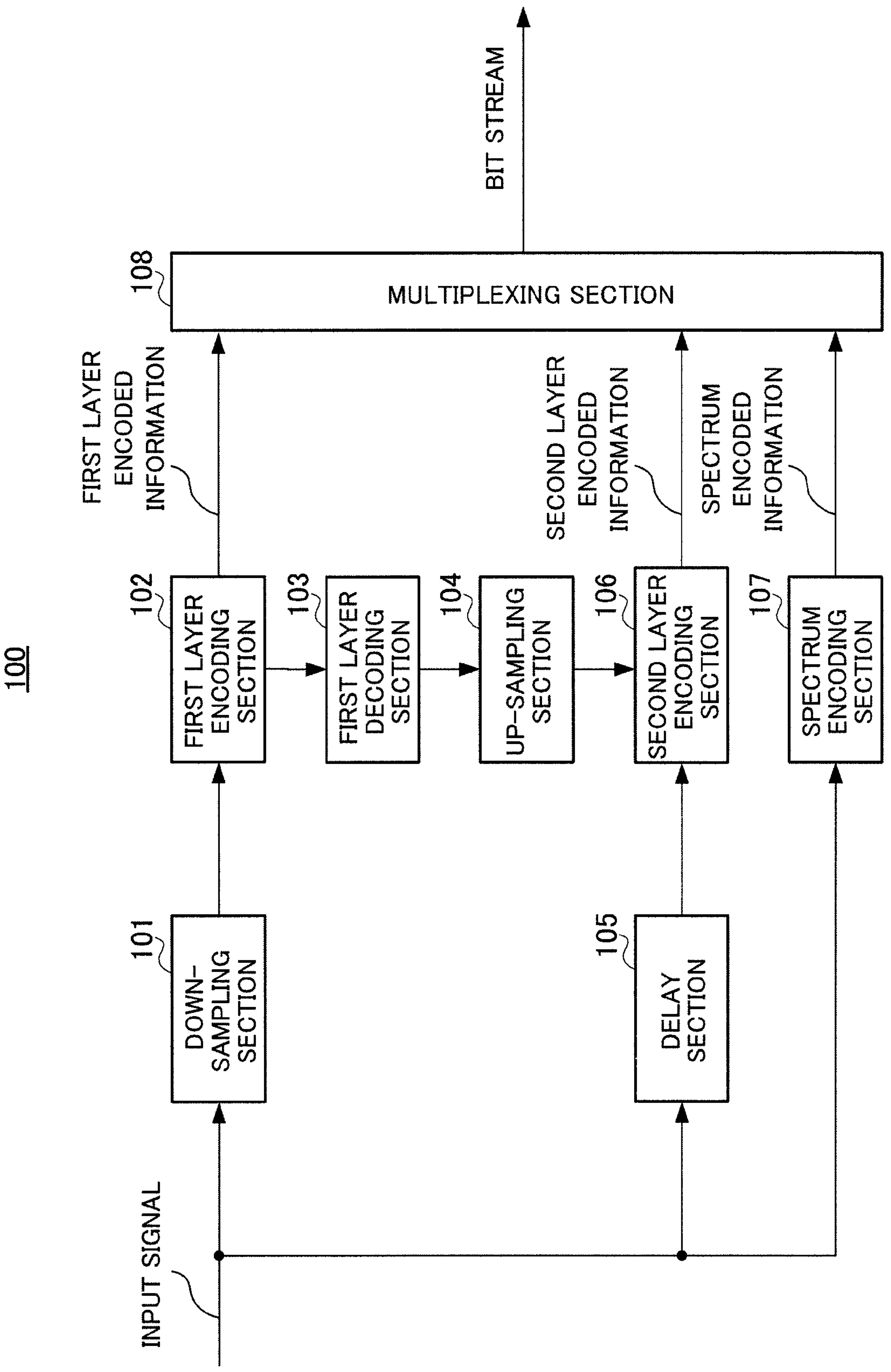
FIG. 1 is a block diagram showing the main configuration of an encoding apparatus according to Embodiment 1 of the present invention.

FIG. 1 is a block diagram showing the main configuration of encoding apparatus 100 according to Embodiment 1 of the present invention.

In this figure, encoding apparatus 100 is equipped with down-sampling section 101, first layer encoding section 102, first layer decoding section 103, up-sampling section 104, delay section 105, second layer encoding section 106, spectrum encoding section 107, and multiplexing section 108, and has a scalable configuration comprising two layers. In the first layer of encoding apparatus 100, an input speech/audio signal is encoded using a CELP (Code Excited Linear Prediction) encoding method, and in second layer encoding, a residual signal of the first layer decoded signal and input signal is encoded. Encoding apparatus 100 separates an input signal into sections of N samples (where N is a natural number), and performs encoding on a frame-by-frame basis with N samples as one frame.

Down-sampling section 101 performs down-sampling processing on an input speech signal and/or audio signal (hereinafter referred to as "speech/audio signal") to convert the speech/audio signal sampling rate from Rate 1 to Rate 2 (where Rate 1>Rate 2), and outputs this signal to first layer encoding section 102.

First layer encoding section 102 performs CELP speech encoding on the post-down-sampling speech/audio signal input from down-sampling section 101, and outputs obtained first layer encoded information to first layer decoding section 103 and multiplexing section 108. Specifically, first layer encoding section 102 encodes a speech signal comprising vocal tract information and excitation information by finding an LPC (Linear Prediction Coefficient) parameter for the vocal tract information, and for the excitation information, performs encoding by finding an index that identifies which previously stored speech model is to be used—that is, an index that identifies which excitation vector of an adaptive codebook and fixed codebook is to be generated.

First layer decoding section 103 performs CELP speech decoding on first layer encoded information input from first layer encoding section 102, and outputs an obtained first layer decoded signal to up-sampling section 104.

Up-sampling section 104 performs up-sampling processing on the first layer decoded signal input from first layer decoding section 103 to convert the first layer decoded signal sampling rate from Rate 2 to Rate 1, and outputs this signal to second layer encoding section 106.

Delay section 105 outputs a delayed speech/audio signal to second layer encoding section 106 by outputting an input speech/audio signal after storing that input signal in an internal buffer for a predetermined time. The predetermined delay time here is a time that takes account of algorithm delay that arises in down-sampling section 101, first layer encoding section 102, first layer decoding section 103, and up-sampling section 104.

Second layer encoding section 106 performs second layer encoding by performing gain/shape quantization on a residual signal of the speech/audio signal input from delay section 105 and the post-up-sampling first layer decoded signal input from up-sampling section 104, and outputs obtained second layer encoded information to multiplexing section 108. The internal configuration and actual operation of second layer encoding section 106 will be described later herein.

Spectrum encoding section 107 transforms an input speech/audio signal to the frequency domain, analyzes the correlation between a low-band component and high-band component of the obtained input spectrum, calculates a parameter for performing band enhancement on the decoding side and estimating a high-band component from a low-band component, and outputs this to multiplexing section 108 as spectrum encoded information. The internal configuration and actual operation of spectrum encoding section 107 will be described later herein.

Multiplexing section 108 multiplexes first layer encoded information input from first layer encoding section 102, second layer encoded information input from second layer encoding section 106 and spectrum encoded information input from spectrum encoding section 107, and transmits the obtained bit stream to a decoding apparatus.

Figure 2:
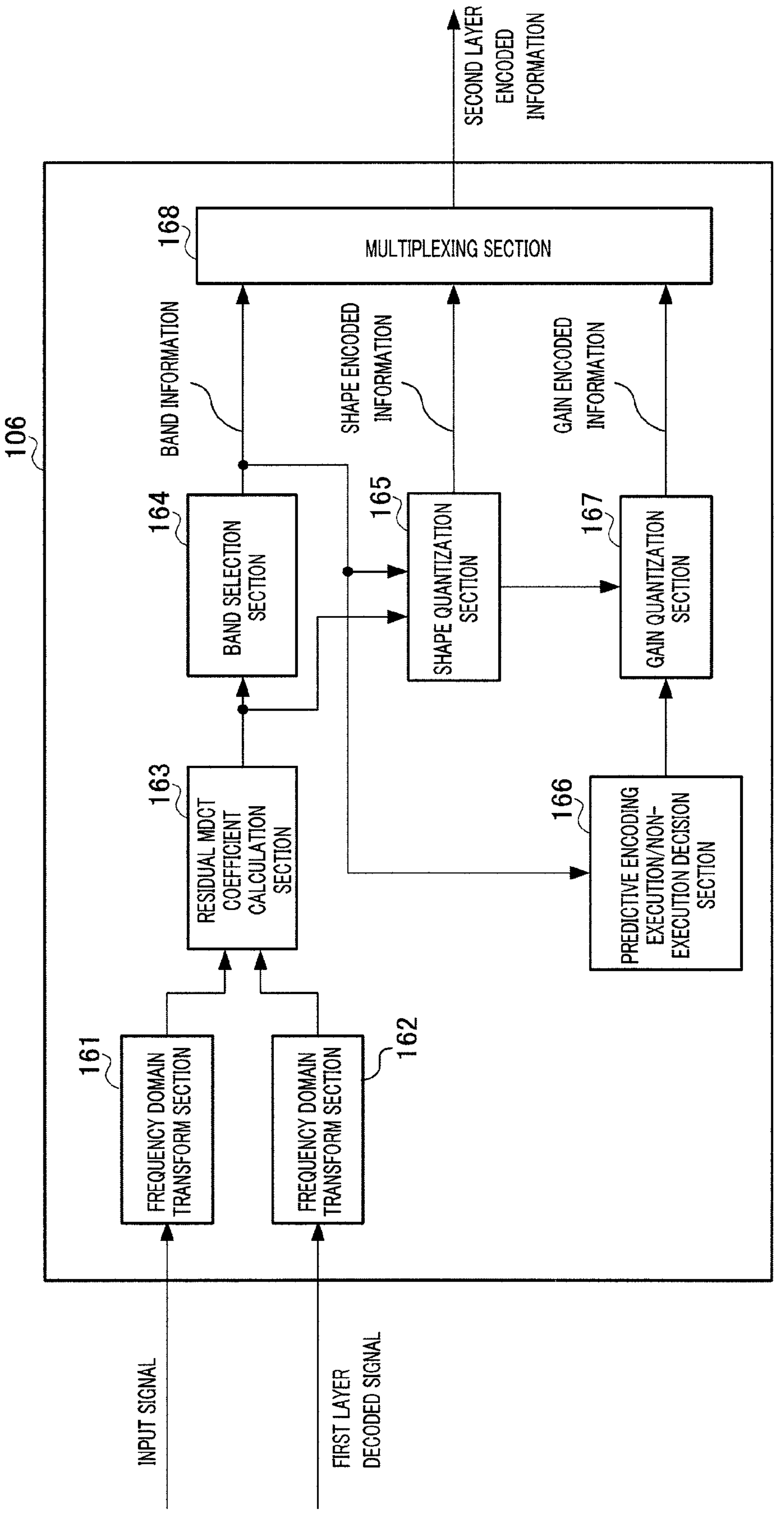
FIG. 2 is a block diagram showing the main configuration of the interior of a second layer encoding section according to Embodiment 1 of the present invention.

FIG. 2 is a block diagram showing the main configuration of the interior of second layer encoding section 106.

In this figure, second layer encoding section 106 is equipped with frequency domain transform sections 161 and 162, residual MDCT coefficient calculation section 163, band selection section 164, shape quantization section 165, predictive encoding execution/non-execution decision section 166, gain quantization section 167, and multiplexing section 168.

Frequency domain transform section 161 performs a Modified Discrete Cosine Transform (MDCT) using a delayed input signal input from delay section 105, and outputs an obtained input MDCT coefficient to residual MDCT coefficient calculation section 163.

Frequency domain transform section 162 performs an MDCT using a post-up-sampling first layer decoded signal input from up-sampling section 104, and outputs an obtained first layer MDCT coefficient to residual MDCT coefficient calculation section 163.

Residual MDCT coefficient calculation section 163 calculates a residue of the input MDCT coefficient input from frequency domain transform section 161 and the first layer MDCT coefficient input from frequency domain transform section 162, and outputs an obtained residual MDCT coefficient to band selection section 164 and shape quantization section 165.

Band selection section 164 divides the residual MDCT coefficient input from residual MDCT coefficient calculation section 163 into a plurality of subbands, selects a band that will be a target of quantization (quantization target band) from the plurality of subbands, and outputs band information indicating the selected band to shape quantization section 165, predictive encoding execution/non-execution decision section 166, and multiplexing section 168. Methods of selecting a quantization target band here include selecting the band having the highest energy, making a selection while simultaneously taking account of correlation with a quantization target band selected in the past and energy, and so forth.

Shape quantization section 165 performs shape quantization using an MDCT coefficient corresponding to a quantization target band indicated by band information input from band selection section 164 from among residual MDCT coefficients input from residual MDCT coefficient calculation section 163—that is, a second layer MDCT coefficient—and outputs obtained shape encoded information to multiplexing section 168. In addition, shape quantization section 165 finds a shape quantization ideal gain value, and outputs the obtained ideal gain value to gain quantization section 167.

Predictive encoding execution/non-execution decision section 166 finds a number of sub-subbands common to a current-frame quantization target band and a past-frame quantization target band using the band information input from band selection section 164. Then predictive encoding execution/non-execution decision section 166 determines that predictive encoding is to be performed on the residual MDCT coefficient of the quantization target band indicated by the band information—that is, the second layer MDCT coefficient—if the number of common sub-subbands is greater than or equal to a predetermined value, or determines that predictive encoding is not to be performed on the second layer MDCT coefficient if the number of common sub-subbands is less than the predetermined value. Predictive encoding execution/non-execution decision section 166 outputs the result of this determination to gain quantization section 167.

If the determination result input from predictive encoding execution/non-execution decision section 166 indicates that predictive encoding is to be performed, gain quantization section 167 performs predictive encoding of current-frame quantization target band gain using a past-frame quantization gain value stored in an internal buffer and an internal gain codebook, to obtain gain encoded information. On the other hand, if the determination result input from predictive encoding execution/non-execution decision section 166 indicates that predictive encoding is not to be performed, gain quantization section 167 obtains gain encoded information by performing quantization directly with the ideal gain value input from shape quantization section 165 as a quantization target. Gain quantization section 167 outputs the obtained gain encoded information to multiplexing section 168.

Multiplexing section 168 multiplexes band information input from band selection section 164, shape encoded information input from shape quantization section 165, and gain encoded information input from gain quantization section 167, and transmits the obtained bit stream to multiplexing section 108 as second layer encoded information.

Band information, shape encoded information, and gain encoded information generated by second layer encoding section 106 may also be input directly to multiplexing section 108 and multiplexed with first layer encoded information and spectrum encoded information without passing through multiplexing section 168.

Figure 3:
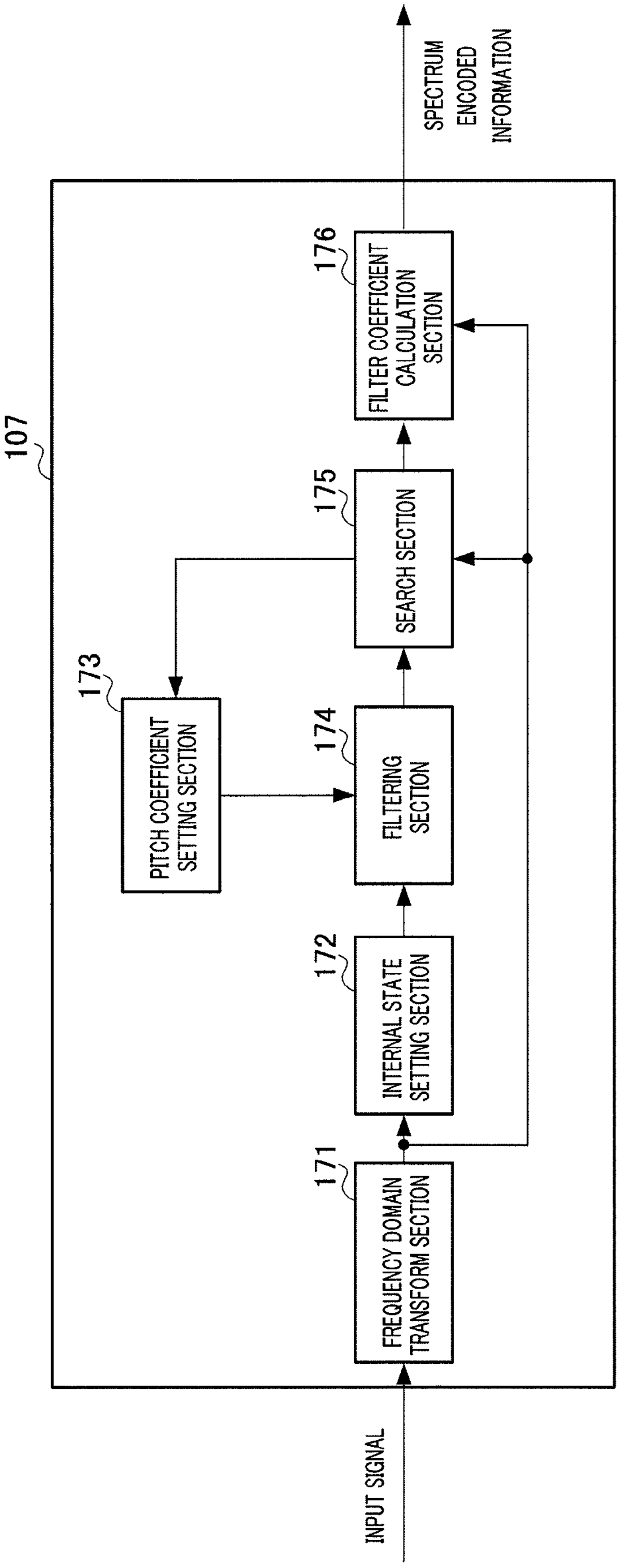
FIG. 3 is a block diagram showing the main configuration of the interior of a spectrum encoding section according to Embodiment 1 of the present invention.

FIG. 3 is a block diagram showing the main configuration of the interior of spectrum encoding section 107.

In this figure, spectrum encoding section 107 has frequency domain transform section 171, internal state setting section 172, pitch coefficient setting section 173, filtering section 174, search section 175, and filter coefficient calculation section 176.

Frequency domain transform section 171 performs frequency transform on an input speech/audio signal with an effective frequency band of $0 \le k < FH$, to calculate input spectrum S(k). A discrete Fourier transform (DFT), discrete cosine transform (DCT), modified discrete cosine transform (MDCT), or the like, is used as a frequency transform method here.

Internal state setting section 172 sets an internal state of a filter used by filtering section 174 using input spectrum S(k) having an effective frequency band of $0 \le k < FH$. This filter internal state setting will be described later herein.

Pitch coefficient setting section 173 gradually varies pitch coefficient T within a predetermined search range of Tmin to Tmax, and sequentially outputs the pitch coefficient T values to filtering section 174.

Filtering section 174 performs input spectrum filtering using the filter internal state set by internal state setting section 172 and pitch coefficient T output from pitch coefficient setting section 173, to calculate input spectrum estimated value S'(k). Details of this filtering processing will be given later herein.

Search section 175 calculates a degree of similarity that is a parameter indicating similarity between input spectrum S(k) input from frequency domain transform section 171 and input spectrum estimated value S'(k) output from filtering section 174. Details of this degree of similarity calculation processing will be given later herein. This degree of similarity calculation processing is performed each time pitch coefficient T is provided to filtering section 174 from pitch coefficient setting section 173, and a pitch coefficient for which the calculated degree of similarity is a maximum—that is, optimum pitch coefficient T' (in the range Tmin to Tmax)—is provided to filter coefficient calculation section 176.

Filter coefficient calculation section 176 finds filter coefficient $\beta_i$ using optimum pitch coefficient T' provided from search section 175 and input spectrum S(k) input from frequency domain transform section 171, and outputs filter coefficient $\beta_i$ and optimum pitch coefficient T' to multiplexing section 108 as spectrum encoded information. Details of filter coefficient $\beta_i$ calculation processing performed by filter coefficient calculation section 176 will be given later herein.

Figure 4:
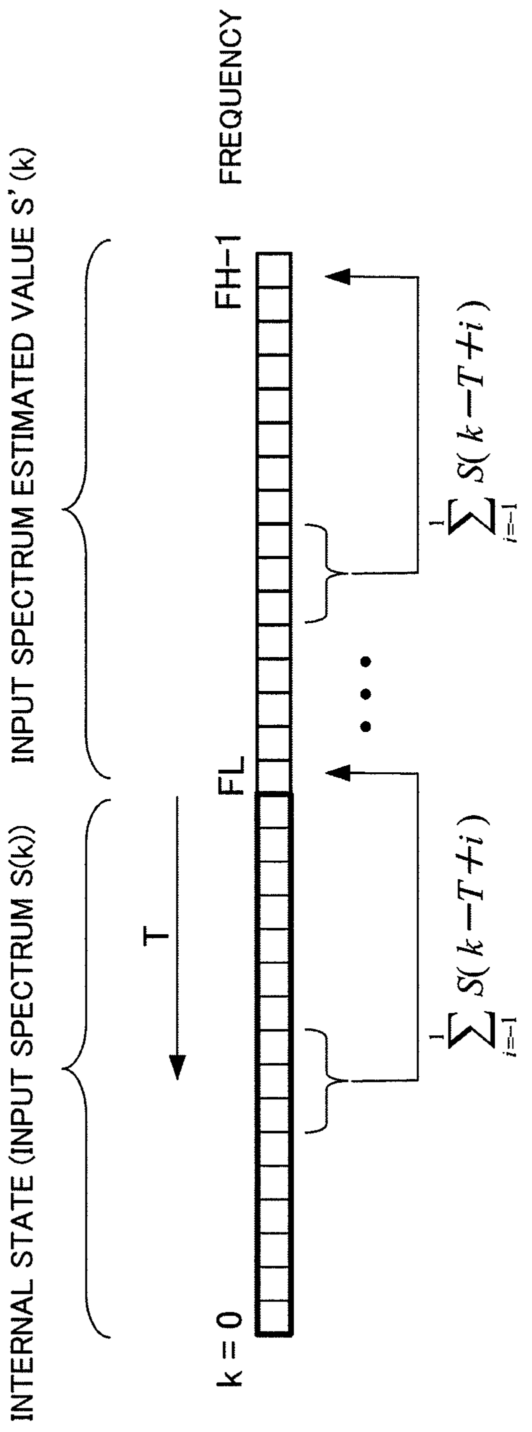
FIG. 4 is a view for explaining an overview of filtering processing of a filtering section according to Embodiment 1 of the present invention.

FIG. 4 is a view for explaining an overview of filtering processing of filtering section 174.

If a spectrum of all frequency bands ($0 \le k < FH$) is called S(k) for convenience, a filtering section 174 filter function expressed by Equation (1) below is used.

[1]

$$P(z) = \sum_{i=-M}^{M} \frac{1}{1 - z^{-T+i}} \qquad \text{(Equation 1)}$$

In this equation, T represents a pitch coefficient input from pitch coefficient setting section 173, and it is assumed that M=1.

As shown in FIG. 4, in the $0 \le k < FL$ band of S(k), input spectrum S(k) is stored as a filter internal state. On the other hand, in the $FL \le k < FH$ band of S(k), input spectrum estimated value S'(k) found using Equation (2) below is stored.

(Equation 2)

$$S'(k)=S(k-T) \qquad [2]$$

In this equation, S'(k) is found from spectrum S(k−T) lower than k in frequency by T by means of filtering processing. Input spectrum estimated value S'(k) is calculated in $FL \le k < FH$ by repeating the calculation shown in Equation (2) above while varying k in the range $FL \le k < FH$ sequentially from a lower frequency (k=FL).

The above filtering processing is performed in the range $FL \le k < FH$ each time pitch coefficient T is provided from pitch coefficient setting section 173, with S(k) being zero-cleared each time. That is to say, S(k) is calculated and output to search section 175 each time pitch coefficient T changes.

Next, degree of similarity calculation processing and optimum pitch coefficient T' derivation processing performed by search section 175 will be described.

First, there are various definitions for a degree of similarity. Here, a case will be described by way of example in which filter coefficients $\beta_{-1}$ and $\beta_1$ are regarded as 0, and a degree of similarity defined by Equation (3) below based on a least-squares error method is used.

[3]

$$E = \sum_{k=FL}^{FH-1} S(k)^2 - \frac{\left(\sum_{k=FL}^{FH-1} S(k) \cdot S'(k)\right)^2}{\sum_{k=FL}^{FH-1} S'(k)^2} \qquad \text{(Equation 3)}$$

When this degree of similarity is used, filter coefficient $\beta_i$ is decided after optimum pitch coefficient T' has been calculated. Filter coefficient $\beta_i$ calculation will be described later herein. Here, E represents a square error between S(k) and S'(k). In this equation, the right-hand input terms are fixed values unrelated to pitch coefficient T, and therefore pitch coefficient T that generates S'(k) for which the right-hand second term is a maximum is searched. Here, the right-hand second term of Equation (3) above is defined as a degree of similarity as shown in Equation (4) below. That is to say, pitch coefficient T' for which degree of similarity A expressed by Equation (4) below is a maximum is searched.

[4]

$$A = \frac{\left(\sum_{k=FL}^{FH-1} S(k) \cdot S'(k)\right)^2}{\sum_{k=FL}^{FH-1} S'(k)^2} \qquad \text{(Equation 4)}$$

FIG. 5 is a view for explaining how an input spectrum estimated value S'(k) spectrum varies in line with variation of pitch coefficient T.

Figure 5A:
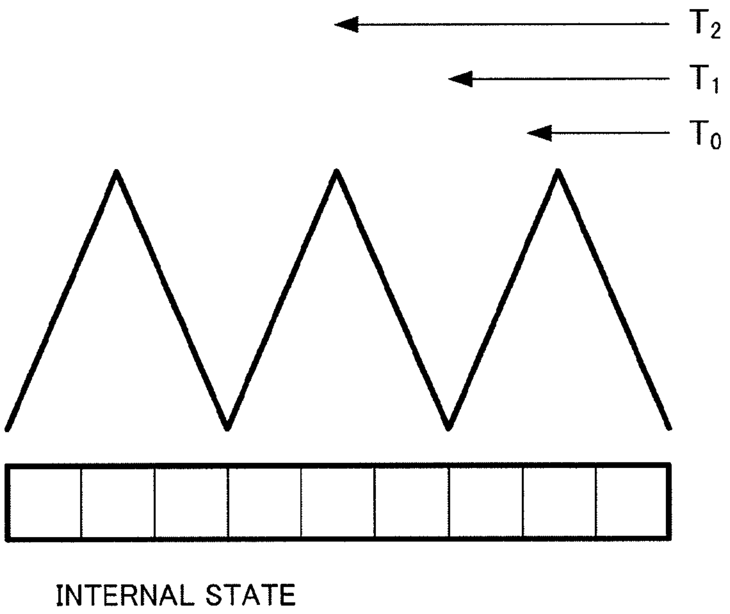
FIG. 5 is a view for explaining how an input spectrum estimated value spectrum varies in line with variation of pitch coefficient T according to Embodiment 1 of the present invention.
Figure 5B:
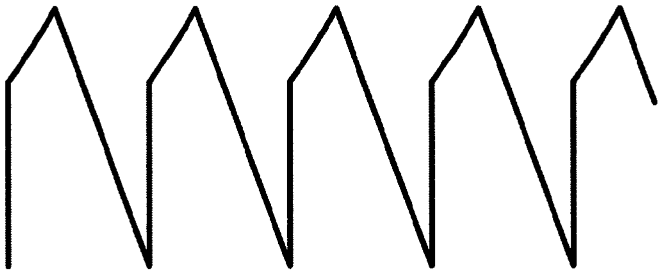
Figure 5C:
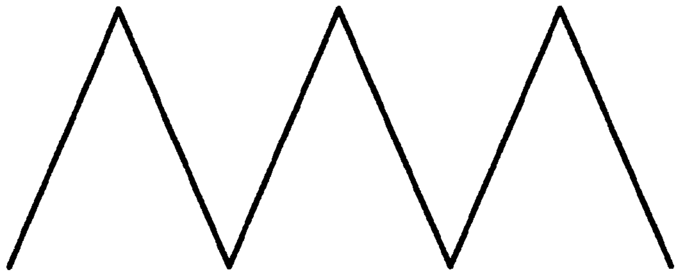
Figure 5D:
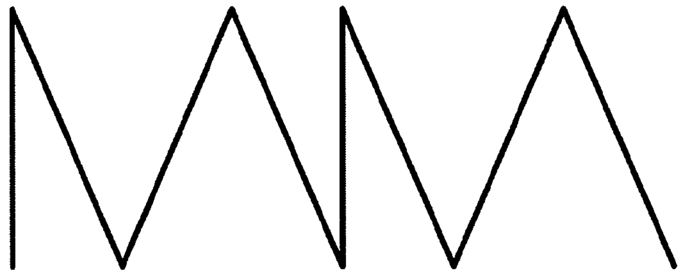
Figure 6A:
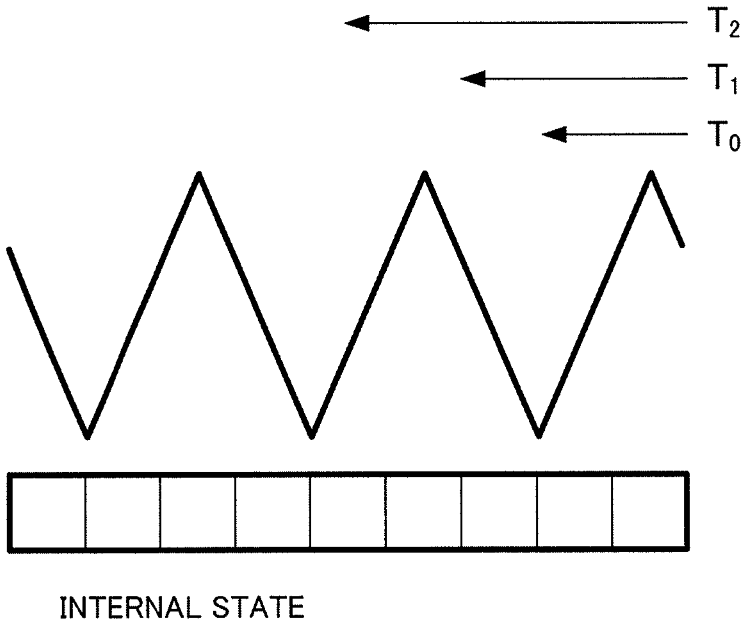
FIG. 6 is a view for explaining how an input spectrum estimated value spectrum varies in line with variation of pitch coefficient T according to Embodiment 1 of the present invention.
Figure 6B:
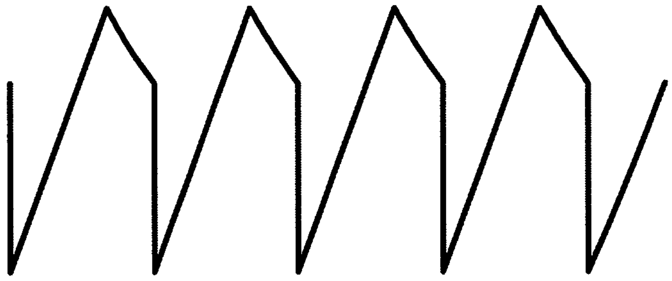
Figure 6C:
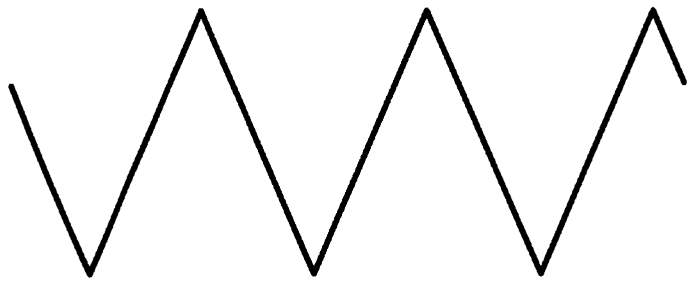
Figure 6D:
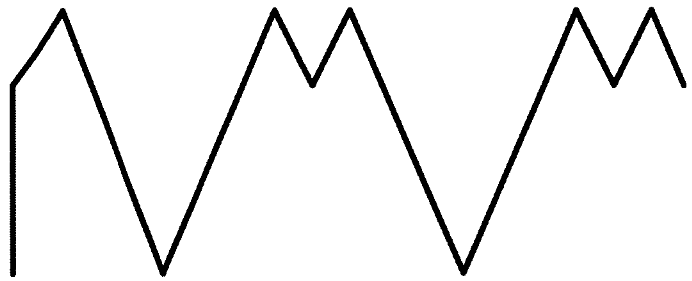

FIG. 5A is a view showing input spectrum S(k) having a harmonic structure, stored as an internal state. FIG. 5B through FIG. 5D are views showing input spectrum estimated value S'(k) spectra calculated by performing filtering using three kinds of pitch coefficients T0, T1, and T2, respectively.

In the examples shown in these views, the spectrum shown in FIG. 5C and the spectrum shown in FIG. 5A are similar, and therefore it can be seen that a degree of similarity calculated using T1 shows the highest value. That is to say, T1 is optimal as pitch coefficient T enabling a harmonic structure to be maintained.

In the same way as FIG. 5, FIG. 6 is also a view for explaining how an input spectrum estimated value S'(k) spectrum varies in line with variation of pitch coefficient T. However, the phase of an input spectrum stored as an internal state differs from the case shown in FIG. 5. The examples shown in FIG. 6 also show a case in which pitch coefficient T for which a harmonic structure is maintained is T1.

In search section 175, varying pitch coefficient T and searching T for which a degree of similarity is a maximum is equivalent to searching a spectrum's harmonic-structure pitch (or integral multiple thereof) by trial and error. Then filtering section 174 calculates input spectrum estimated value S'(k) based on this harmonic-structure pitch, so that a harmonic structure in a connecting section between the input spectrum and estimated spectrum is maintained. This is also easily understood by considering that estimated value S'(k) in connecting section k=FL between input spectrum S(k) and estimated spectrum S'(k) is calculated based on input spectra separated by harmonic-structure pitch (or integral multiple thereof) T.

Next, filter coefficient calculation processing by filter coefficient calculation section 176 will be described.

Filter coefficient calculation section 176 finds filter coefficient $\beta_i$ that makes square distortion E expressed by Equation (5) below a minimum using optimum pitch coefficient T' provided from search section 175.

[5]

$$E = \sum_{k=FL}^{FH-1}\left(S(k) - \sum_{i=-1}^{1} \beta_i \cdot S(k - T' - i)\right)^2 \qquad \text{(Equation 5)}$$

Specifically, filter coefficient calculation section 176 holds a plurality of filter coefficient $\beta_i$ (i=−1, 0, 1) combinations beforehand as a data table, decides a $\beta_i$ (i=−1, 0, 1) combination that makes square distortion E of Equation (5) above a minimum, and outputs the corresponding index.

Figure 7:
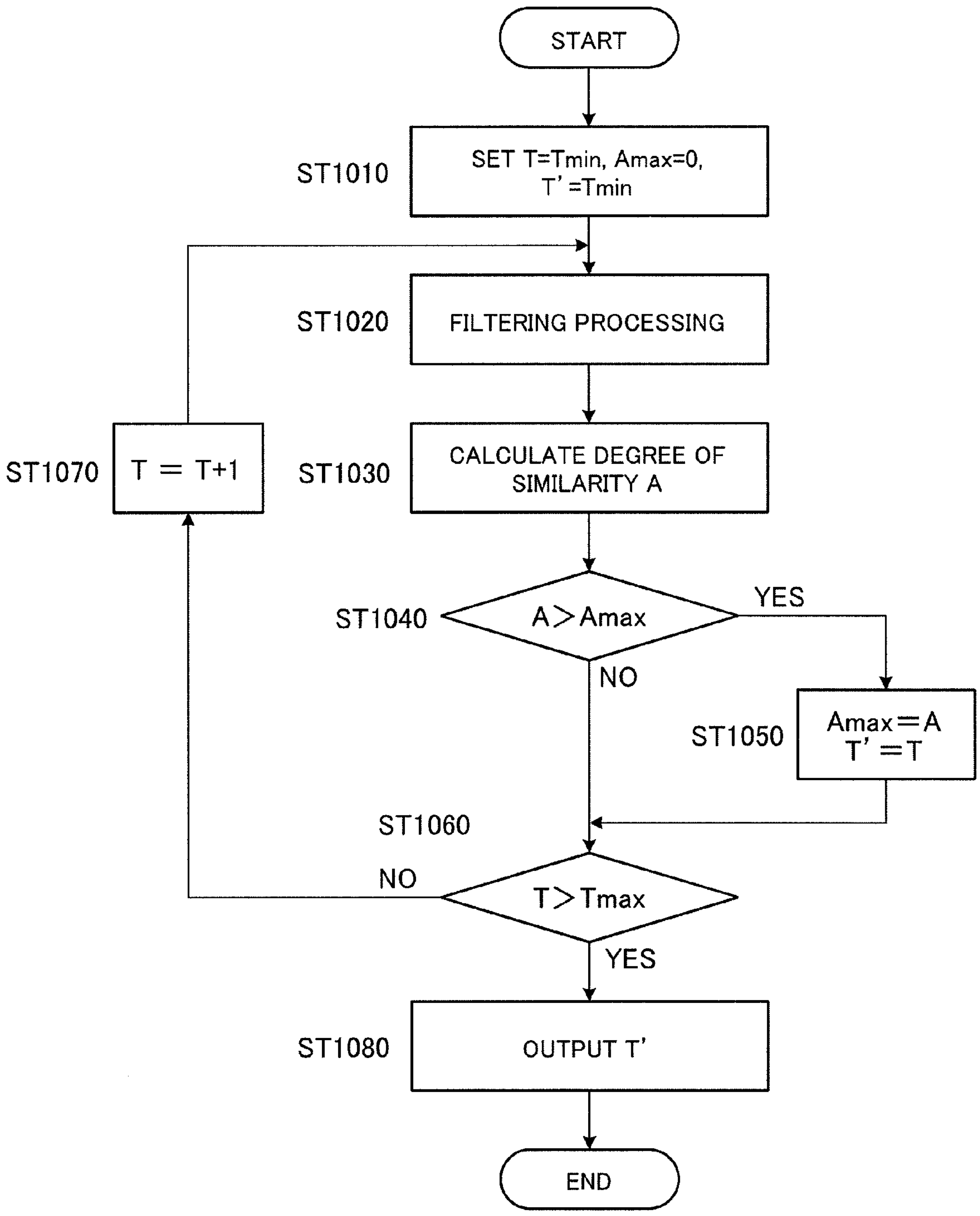
FIG. 7 is a flowchart showing a processing procedure performed by a pitch coefficient setting section, filtering section, and search section according to Embodiment 1 of the present invention.

FIG. 7 is a flowchart showing a processing procedure performed by pitch coefficient setting section 173, filtering section 174, and search section 175.

First, in ST1010, pitch coefficient setting section 173 sets pitch coefficient T and optimum pitch coefficient T' to lower limit Tmin of the search range, and set maximum degree of similarity Amax to 0.

Next, in ST1020, filtering section 174 performs input spectrum filtering to calculate input spectrum estimated value S'(k).

Then, in ST1030, search section 175 calculates degree of similarity A between input spectrum S(k) and input spectrum estimated value S'(k).

Next, in ST1040, search section 175 compares calculated degree of similarity A and maximum degree of similarity Amax.

If the result of the comparison in ST1040 is that degree of similarity A is less than or equal to maximum degree of similarity Amax (ST1040: NO), the processing procedure proceeds to ST1060.

On the other hand, if the result of the comparison in ST1040 is that degree of similarity A is greater than maximum degree of similarity Amax (ST1040: YES), in ST1050 search section 175 updates maximum degree of similarity Amax using degree of similarity A, and updates optimum pitch coefficient T' using pitch coefficient T.

Then, in ST1060, search section 175 compares pitch coefficient T and search range upper limit Tmax.

If the result of the comparison in ST1060 is that pitch coefficient T is less than or equal to search range upper limit Tmax (ST1060: NO), in ST1070 search section 175 increments T by 1 so that T=T+1.

On the other hand, if the result of the comparison in ST1060 is that pitch coefficient T is greater than search range upper limit Tmax (ST1060: YES), search section 175 outputs optimum pitch coefficient T' in ST1080.

Thus, in encoding apparatus 100, spectrum encoding section 107 uses filtering section 174 having a low-band spectrum as an internal state to estimate the shape of a high-band spectrum for the spectrum of an input signal divided into two: a low-band (0≤k<FL) and a high-band (FL≤k<FH). Then, since parameters T' and $\beta_i$ themselves representing filtering section 174 filter characteristics that indicate a correlation between the low-band spectrum and high-band spectrum are transmitted to a decoding apparatus instead of the high-band spectrum, high-quality encoding of the spectrum can be performed at a low bit rate. Here, optimum pitch coefficient T' and filter coefficient $\beta_i$ indicating a correlation between the low-band spectrum and high-band spectrum are also estimation parameters that estimate the high-band spectrum from the low-band spectrum.

Also, when filtering section 174 of spectrum encoding section 107 estimates the shape of the high-band spectrum using the low-band spectrum, pitch coefficient setting section 173 variously varies and outputs a frequency difference between the low-band spectrum and high-band spectrum that is an estimation criterion—that is, pitch coefficient T—and search section 175 searches for pitch coefficient T' for which the degree of similarity between the low-band spectrum and high-band spectrum is a maximum. Consequently, the shape of the high-band spectrum can be estimated based on a harmonic-structure pitch of the overall spectrum, encoding can be performed while maintaining the harmonic structure of the overall spectrum, and decoded speech signal quality can be improved.

As encoding can be performed while maintaining the harmonic structure of the overall spectrum, it is not necessary to set the bandwidth of the low-band spectrum based on the harmonic-structure pitch—that is, it is not necessary to align the low-band spectrum bandwidth with harmonic-structure pitch (or an integral multiple thereof)—and the bandwidth can be set arbitrarily. Therefore, in a connecting section between the low-band spectrum and high-band spectrum, the spectra can be connected smoothly by means of a simple operation, and decoded speech signal quality can be improved.

Figure 8:
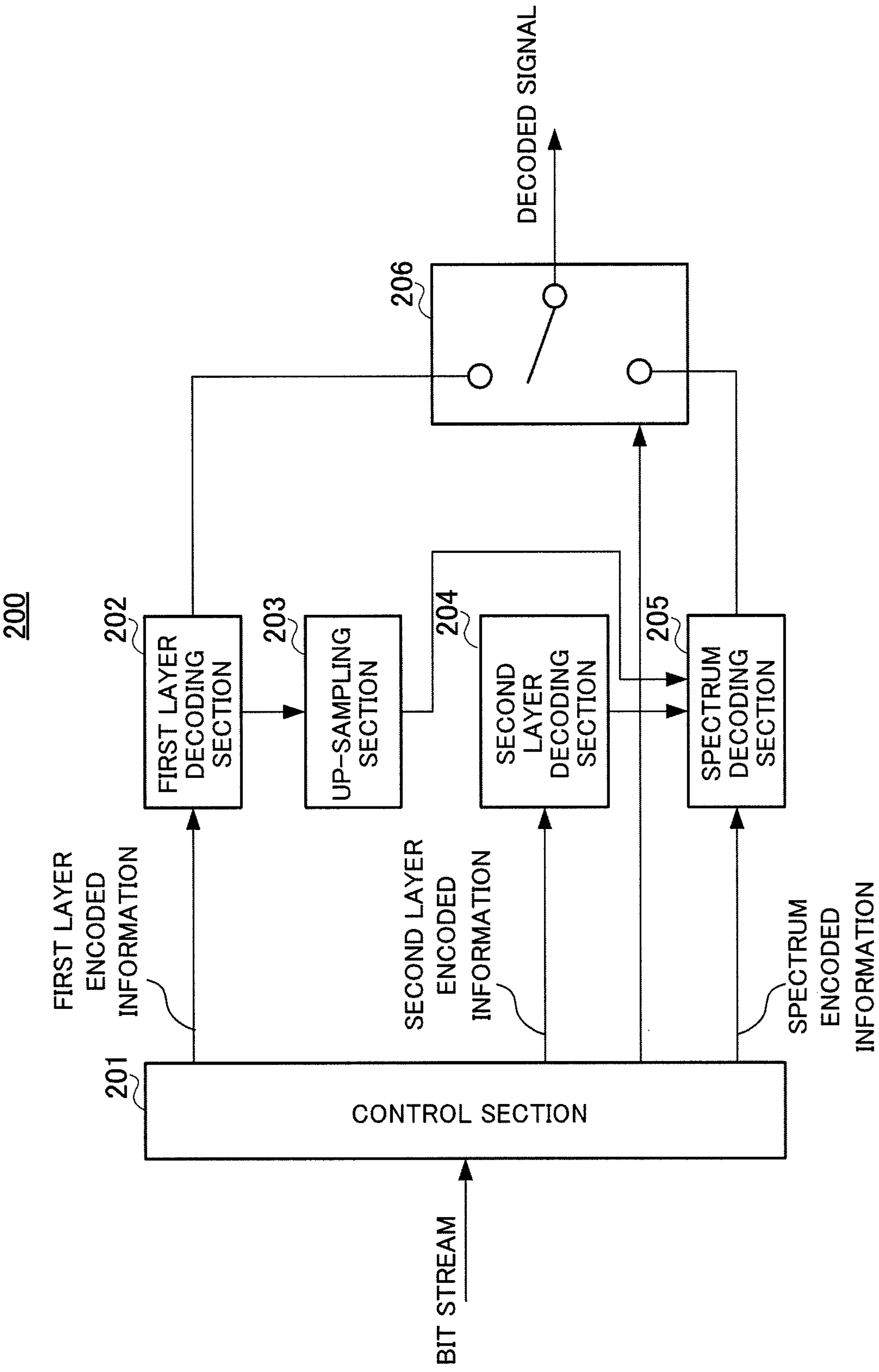
FIG. 8 is a block diagram showing the main configuration of a decoding apparatus according to Embodiment 1 of the present invention.

FIG. 8 is a block diagram showing the main configuration of decoding apparatus 200 according to this embodiment.

In this figure, decoding apparatus 200 is equipped with control section 201, first layer decoding section 202, up-sampling section 203, second layer decoding section 204, spectrum decoding section 205, and switch 206.

Control section 201 separates first layer encoded information, second layer encoded information, and spectrum encoded information composing a bit stream transmitted from encoding apparatus 100, and outputs obtained first layer encoded information to first layer decoding section 202, second layer encoded information to second layer decoding section 204, and spectrum encoded information to spectrum decoding section 205. Control section 201 also adaptively generates control information controlling switch 206 according to configuration elements of a bit stream transmitted from encoding apparatus 100, and outputs this control information to switch 206.

First layer decoding section 202 performs CELP decoding on first layer encoded information input from control section 201, and outputs the obtained first layer decoded signal to up-sampling section 203 and switch 206.

Up-sampling section 203 performs up-sampling processing on the first layer decoded signal input from first layer decoding section 202 to convert the first layer decoded signal sampling rate from Rate 2 to Rate 1, and outputs this signal to spectrum decoding section 205.

Second layer decoding section 204 performs gain/shape dequantization using the second layer encoded information input from control section 201, and outputs an obtained second layer MDCT coefficient—that is, a quantization target band residual MDCT coefficient—to spectrum decoding section 205. The internal configuration and actual operation of second layer decoding section 204 will be described later herein.

Spectrum decoding section 205 performs band enhancement processing using the second layer MDCT coefficient input from second layer decoding section 204, spectrum encoded information input from control section 201, and the post-up-sampling first layer decoded signal input from up-sampling section 203, and outputs an obtained second layer decoded signal to switch 206. The internal configuration and actual operation of spectrum decoding section 205 will be described later herein.

Based on control information input from control section 201, if the bit stream transmitted to decoding apparatus 200 from encoding apparatus 100 comprises first layer encoded information, second layer encoded information, and spectrum encoded information, or if this bit stream comprises first layer encoded information and spectrum encoded information, or if this bit stream comprises first layer encoded information and second layer encoded information, switch 206 outputs the second layer decoded signal input from spectrum decoding section 205 as a decoded signal. On the other hand, if this bit stream comprises only first layer encoded information, switch 206 outputs the first layer decoded signal input from first layer decoding section 202 as a decoded signal.

Figure 9:
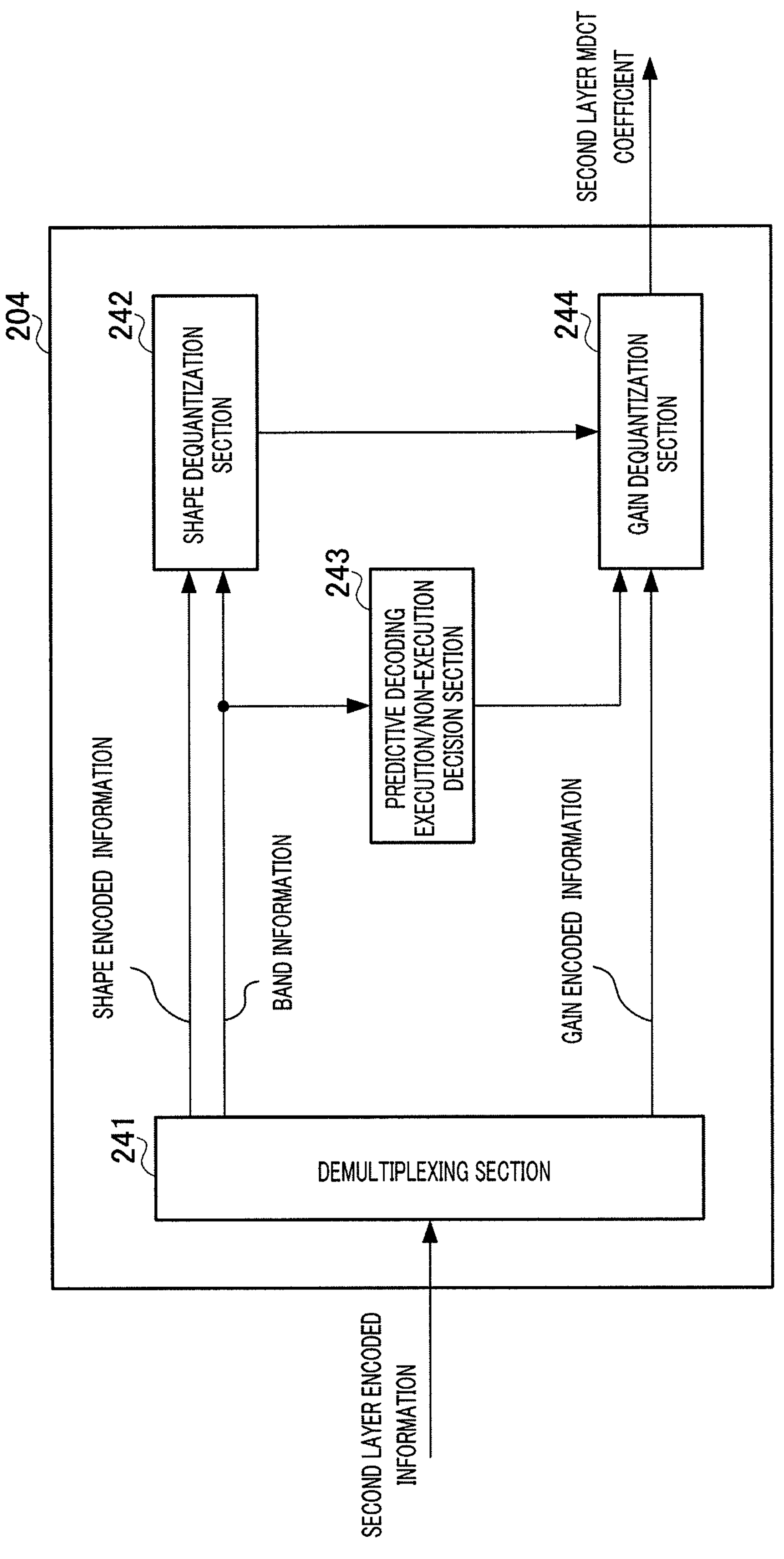
FIG. 9 is a block diagram showing the main configuration of the interior of a second layer decoding section according to Embodiment 1 of the present invention.

FIG. 9 is a block diagram showing the main configuration of the interior of second layer decoding section 204.

In this figure, second layer decoding section 204 is equipped with demultiplexing section 241, shape dequantization section 242, predictive decoding execution/non-execution decision section 243, and gain dequantization section 244.

Demultiplexing section 241 demultiplexes band information, shape encoded information, and gain encoded information from second layer encoded information input from control section 201, outputs the obtained band information to shape dequantization section 242 and predictive decoding execution/non-execution decision section 243, outputs the obtained shape encoded information to shape dequantization section 242, and outputs the obtained gain encoded information to gain dequantization section 244.

Shape dequantization section 242 decodes shape encoded information input from demultiplexing section 241 to find the shape value of an MDCT coefficient corresponding to a quantization target band indicated by band information input from demultiplexing section 241, and outputs the found shape value to gain dequantization section 244.

Predictive decoding execution/non-execution decision section 243 finds a number of subbands common to a current-frame quantization target band and a past-frame quantization target band using the band information input from demultiplexing section 241. Then predictive decoding execution/non-execution decision section 243 determines that predictive decoding is to be performed on the MDCT coefficient of the quantization target band indicated by the band information if the number of common subbands is greater than or equal to a predetermined value, or determines that predictive decoding is not to be performed on the MDCT coefficient of the quantization target band indicated by the band information if the number of common subbands is less than the predetermined value. Predictive decoding execution/non-execution decision section 243 outputs the result of this determination to gain dequantization section 244.

If the determination result input from predictive decoding execution/non-execution decision section 243 indicates that predictive decoding is to be performed, gain dequantization section 244 performs predictive decoding on gain encoded information input from demultiplexing section 241 using a past-frame gain value stored in an internal buffer and an internal gain codebook, to obtain a gain value. On the other hand, if the determination result input from predictive decoding execution/non-execution decision section 243 indicates that predictive decoding is not to be performed, gain dequantization section 244 obtains a gain value by directly performing dequantization of gain encoded information input from demultiplexing section 241 using the internal gain codebook. Gain dequantization section 244 also finds and outputs a second layer MDCT coefficient—that is, a residual MDCT coefficient of the quantization target band—using the obtained gain value and a shape value input from shape dequantization section 242.

The operation in second layer decoding section 204 having the above-described configuration is the reverse of the operation in second layer encoding section 106, and therefore a detailed description thereof is omitted here.

Figure 10:
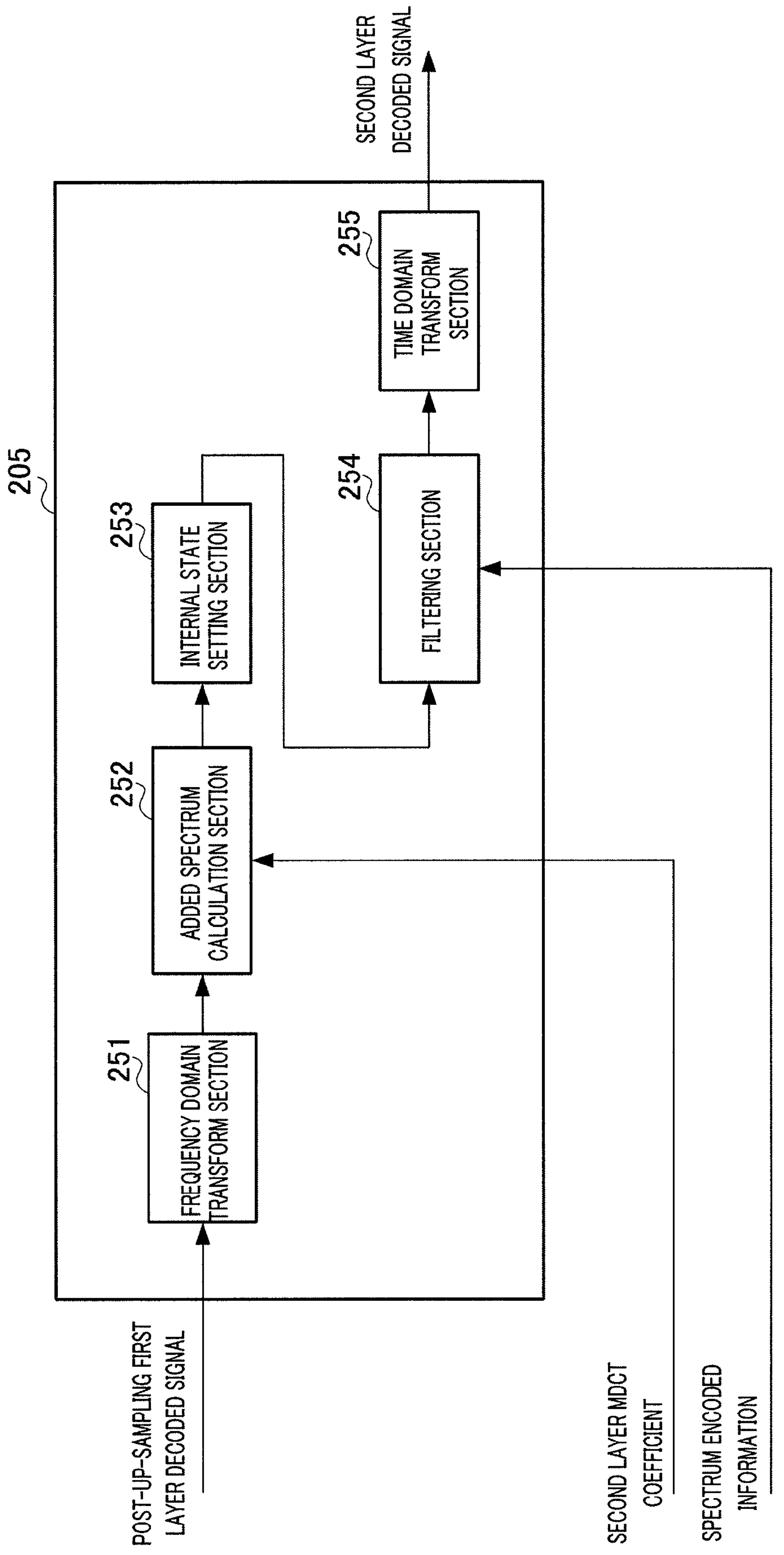
FIG. 10 is a block diagram showing the main configuration of the interior of a spectrum decoding section according to Embodiment 1 of the present invention.

FIG. 10 is a block diagram showing the main configuration of the interior of spectrum decoding section 205.

In this figure, spectrum decoding section 205 has frequency domain transform section 251, added spectrum calculation section 252, internal state setting section 253, filtering section 254, and time domain transform section 255.

Frequency domain transform section 251 executes frequency transform on a post-up-sampling first layer decoded signal input from up-sampling section 203, to calculate first spectrum S1($k$), and outputs this to added spectrum calculation section 252. Here, the effective frequency band of the post-up-sampling first layer decoded signal is $0 \le k < FL$, and a discrete Fourier transform (DFT), discrete cosine transform (DCT), modified discrete cosine transform (MDCT), or the like, is used as a frequency transform method.

When first spectrum S1($k$) is input from frequency domain transform section 251, and a second layer MDCT coefficient (hereinafter referred to as second spectrum S2($k$)) is input from second layer decoding section 204, added spectrum calculation section 252 adds together first spectrum S1($k$) and second spectrum S2($k$), and outputs the result of this addition to internal state setting section 253 as added spectrum S3($k$). If only first spectrum S1($k$) is input from frequency domain transform section 251, and second spectrum S2($k$) is not input from second layer decoding section 204, added spectrum calculation section 252 outputs first spectrum S1($k$) to internal state setting section 253 as added spectrum S3($k$).

Internal state setting section 253 sets a filter internal state used by filtering section 254 using added spectrum S3($k$).

Filtering section 254 generates added spectrum estimated value S3'(k) by performing added spectrum S3($k$) filtering using the filter internal state set by internal state setting section 253 and optimum pitch coefficient T' and filter coefficient $\beta_i$ included in spectrum encoded information input from control section 201. Then filtering section 254 outputs decoded spectrum S'(k) composed of added spectrum S3($k$) and added spectrum estimated value S3'(k) to time domain transform section 255. In such a case, filtering section 254 uses the filter function represented by Equation (1) above.

Figure 11:
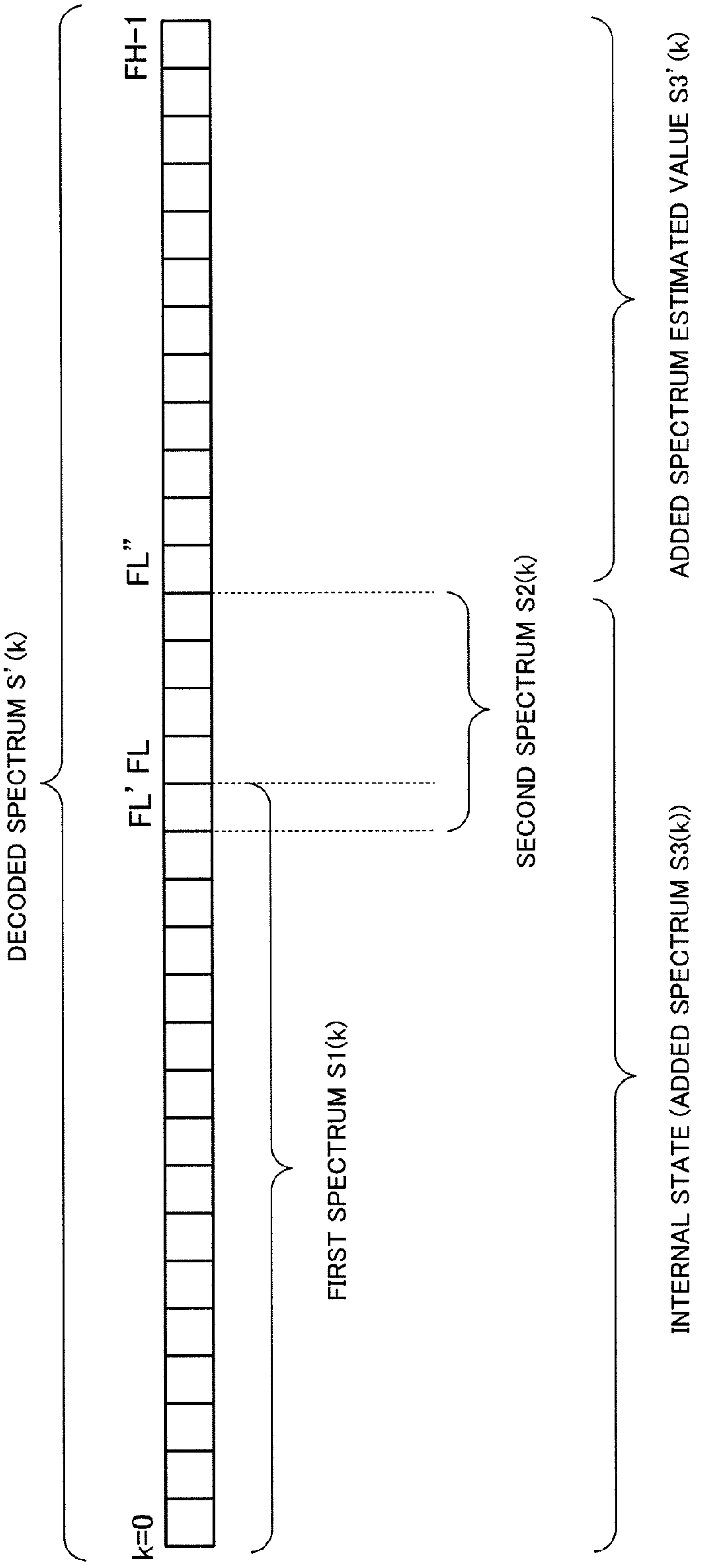
FIG. 11 is a view showing a decoded spectrum generated by a filtering section according to Embodiment 1 of the present invention.

FIG. 11 is a view showing decoded spectrum S'(k) generated by filtering section 254.

Filtering section 254 performs filtering using not the first layer MDCT coefficient, which is the low-band (0≤k<FL) spectrum, but added spectrum S3($k$) with a band of 0≤k<FL" resulting from adding together the first layer MDCT coefficient (0≤k<FL) and second layer MDCT coefficient (FL≤k<FL"), to obtain added spectrum estimated value S3'(k). Therefore, as shown in FIG. 11, a quantization target band indicated by band information—that is, decoded spectrum S'(k) in a band comprising the 0≤k<FL" band—is composed of added spectrum S3($k$), and a part not overlapping the quantization target band within frequency band FL≤k<FH—that is, decoded spectrum S'(k) in frequency band FL"≤k<FH—is composed of added spectrum estimated value S3'(k). In short, decoded spectrum S'(k) in frequency band FL'≤k<FL" has the value of added spectrum S3($k$) itself rather than added spectrum estimated value S3'(k) obtained by filtering processing by filtering section 254 using added spectrum S3($k$).

In FIG. 11, a case is shown by way of example in which a first spectrum S1($k$) band and second spectrum S2($k$) band partially overlap. Depending on the result of quantization target band selection by band selection section 164, a first spectrum S1($k$) band and second spectrum S2($k$) band may also completely overlap, or a first spectrum S1($k$) band and second spectrum S2($k$) band may be non-adjacent and separated.

Figure 12:
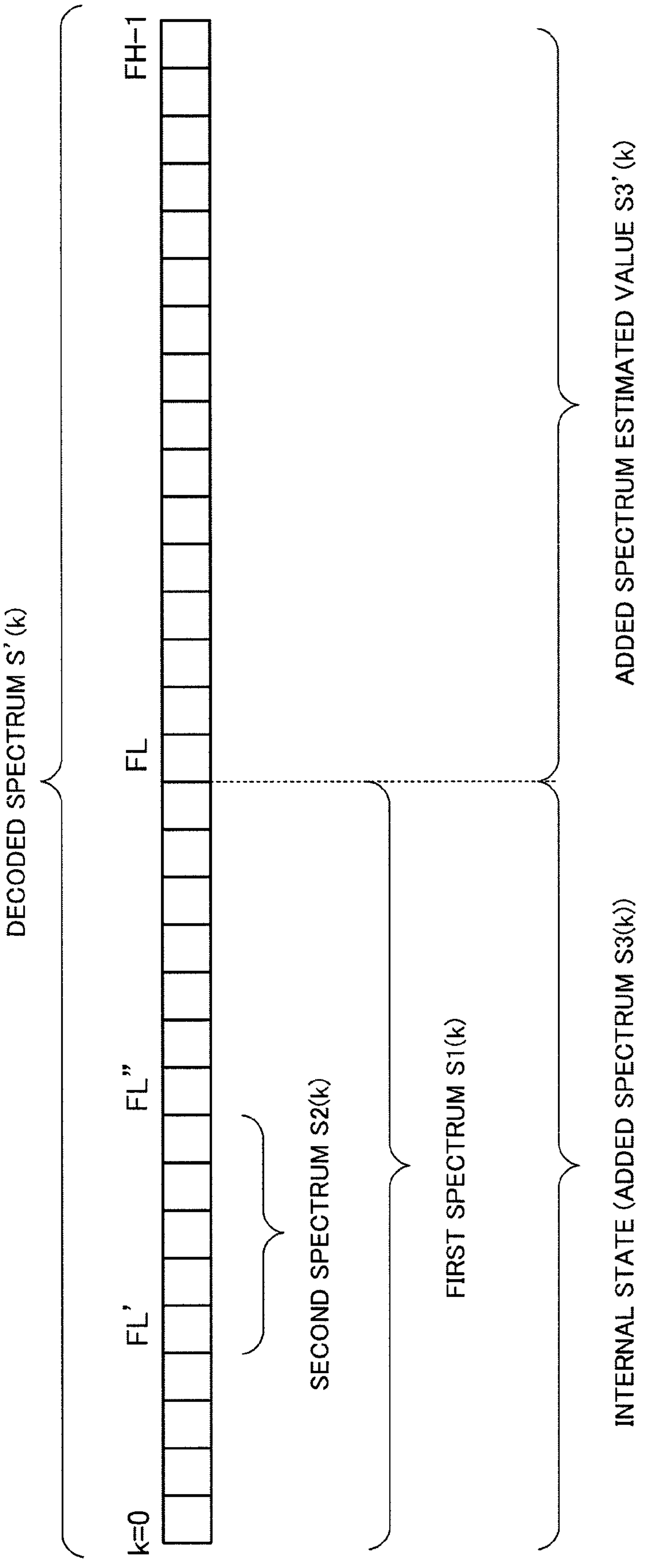
FIG. 12 is a view showing a case in which a second spectrum S2($k$) band is completely overlapped by a first spectrum S1($k$) band according to Embodiment 1 of the present invention.

FIG. 12 is a view showing a case in which a second spectrum S2($k$) band is completely overlapped by a first spectrum S1($k$) band. In such a case, decoded spectrum S'(k) in frequency band FL≤k<FH has the value of added spectrum estimated value S3'(k) itself. Here, the value of added spectrum S3($k$) is obtained by adding together the value of first spectrum S1($k$) and the value of second spectrum S2($k$), and therefore the accuracy of added spectrum estimated value S3'(k) improves, and consequently decoded speech signal quality improves.

Figure 13:
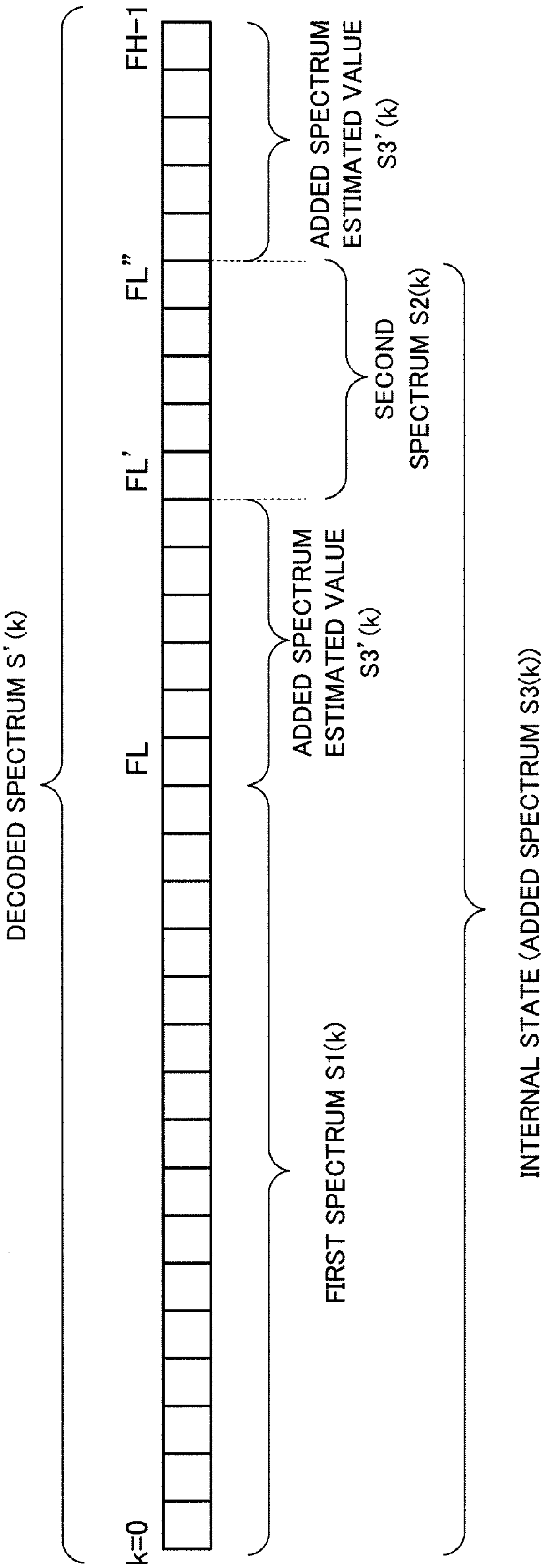
FIG. 13 is a view showing a case in which a first spectrum S1($k$) band and a second spectrum S2($k$) band are non-adjacent and separated according to Embodiment 1 of the present invention.

FIG. 13 is a view showing a case in which a first spectrum S1($k$) band and a second spectrum S2($k$) band are non-adjacent and separated. In such a case, filtering section 254 finds added spectrum estimated value S3'(k) using first spectrum S1($k$), and performs band enhancement processing on frequency band FL≤k<FH. However, within frequency band FL≤k<FH, part of added spectrum estimated value S3'(k) corresponding to the second spectrum S2($k$) band is replaced using second spectrum S2($k$). The reason for this is that the accuracy of second spectrum S2($k$) is greater than that of added spectrum estimated value S3'(k), and decoded speech signal quality is thereby improved.

Time domain transform section 255 transforms decoded spectrum S'(k) input from filtering section 254 to a time domain signal, and outputs this as a second layer decoded signal. Time domain transform section 255 performs appropriate windowing, overlapped addition, and suchlike processing as necessary to prevent discontinuities between consecutive frames.

Thus, according to this embodiment, an encoding band is selected in an upper layer on the encoding side, and on the decoding side lower layer and upper layer decoded spectra are added together, band enhancement is performed using an obtained added spectrum, and a component of a band that could not be decoded by the lower layer or upper layer is decoded. Consequently, highly accurate high-band spectrum data can be calculated flexibly according to an encoding band selected in an upper layer on the encoding side, and a better-quality decoded signal can be obtained.

In this embodiment, a case has been described by way of example in which second layer encoding section 106 selects a band that becomes a quantization target and performs second layer encoding, but the present invention is not limited to this, and second layer encoding section 106 may also encode a component of a fixed band, or may encode a component of the same kind of band as a band encoded by first layer encoding section 102.

In this embodiment, a case has been described by way of example in which decoding apparatus 200 performs filtering on added spectrum S3($k$) using optimum pitch coefficient T' and filter coefficient $\beta_i$ included in spectrum encoded information, and estimates a high-band spectrum by generating added spectrum estimated value S3'(k), but the present invention is not limited to this, and decoding apparatus 200 may also estimate a high-band spectrum by performing filtering on first spectrum S1($k$).

In this embodiment, a case has been described by way of example in which M=1 in Equation (1), but M is not limited to this, and it is possible to use an integer or 0 or above (a natural number) for M.

In this embodiment, a CELP type of encoding/decoding method is used in the first layer, but another encoding/decoding method may also be used.

In this embodiment, a case has been described by way of example in which encoding apparatus 100 performs layered encoding (scalable encoding), but the present invention is not limited to this, and may also be applied to an encoding apparatus that performs encoding of a type other than layered encoding.

In this embodiment, a case has been described by way of example in which encoding apparatus 100 has frequency domain transform sections 161 and 162, but these are configuration elements necessary when a time domain signal is used as an input signal and the present invention is not limited to this, and frequency domain transform sections 161 and 162 need not be provided when a spectrum is input directly to spectrum encoding section 107.

In this embodiment, a case has been described by way of example in which a filter coefficient is calculated by filter coefficient calculation section 176 after a pitch coefficient has been calculated by filtering section 174, but the present invention is not limited to this, and a configuration may also be used in which filter coefficient calculation section 176 is not provided and a filter coefficient is not calculated. A configuration may also be used in which filter coefficient calculation section 176 is not provided, filtering is performed by filtering section 174 using a pitch coefficient and filter coefficient, and an optimum pitch coefficient and filter coefficient are searched for simultaneously. In such a case, Equation (6) and Equation (7) below are used instead of Equation (1) and Equation (2) above.

[6]

$$P(z) = \sum_{i=-M}^{M} \frac{1}{1 - \beta_i \cdot z^{-T+i}} \quad \text{(Equation 6)}$$

[7]

$$S'(k) = \sum_{i=-1}^{M} \beta_i \cdot S(k - T - i) \quad \text{(Equation 7)}$$

In this embodiment, a case has been described by way of example in which a high-band spectrum is encoded using a low-band spectrum—that is, taking a low-band spectrum as an encoding basis—but the present invention is not limited to this, and a spectrum that serves as a basis may be set in a different way. For example, although not desirable from the standpoint of efficient energy use, a low-band spectrum may be encoded using a high-band spectrum, or a spectrum of another band may be encoded taking an intermediate frequency band as an encoding basis.

Embodiment 2

Figure 14:
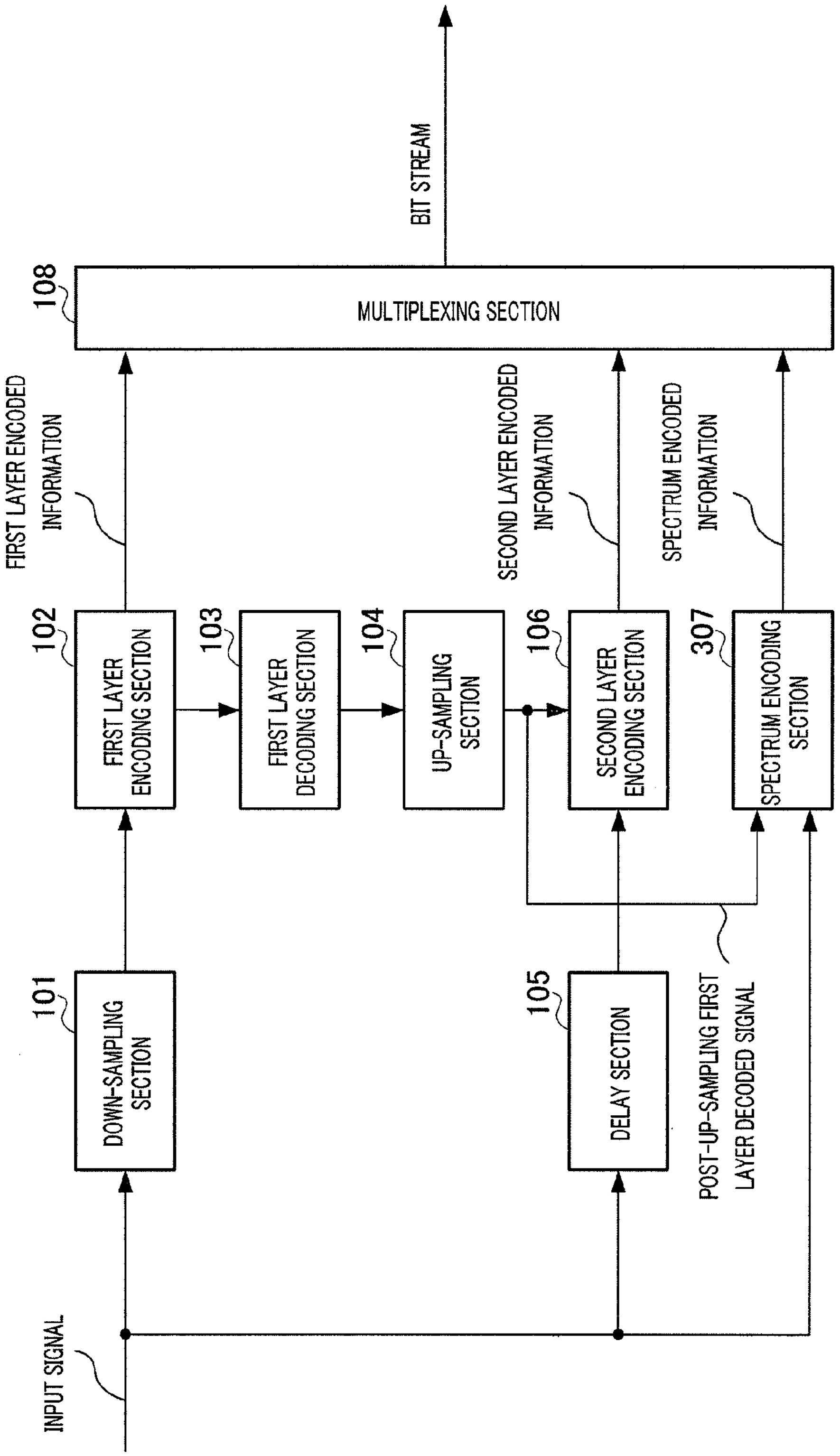
FIG. 14 is a block diagram showing the main configuration of an encoding apparatus according to Embodiment 2 of the present invention.

FIG. 14 is a block diagram showing the main configuration of encoding apparatus 300 according to Embodiment 2 of the present invention. Encoding apparatus 300 has a similar basic configuration to that of encoding apparatus 100 according to Embodiment 1 (see FIG. 1 through FIG. 3), and therefore identical configuration elements are assigned the same reference codes and descriptions thereof are omitted here.

Processing differs in part between spectrum encoding section 307 of encoding apparatus 300 and spectrum encoding section 107 of encoding apparatus 100, and a different reference code is assigned to indicate this.

Spectrum encoding section 307 transforms a speech/audio signal that is an encoding apparatus 300 input signal, and a post-up-sampling first layer decoded signal input from up-sampling section 104, to the frequency domain, and obtains an input spectrum and first layer decoded spectrum. Then spectrum encoding section 307 analyzes the correlation between a first layer decoded spectrum low-band component and an input spectrum high-band component, calculates a parameter for performing band enhancement on the decoding side and estimating a high-band component from a low-band component, and outputs this to multiplexing section 108 as spectrum encoded information.

Figure 15:
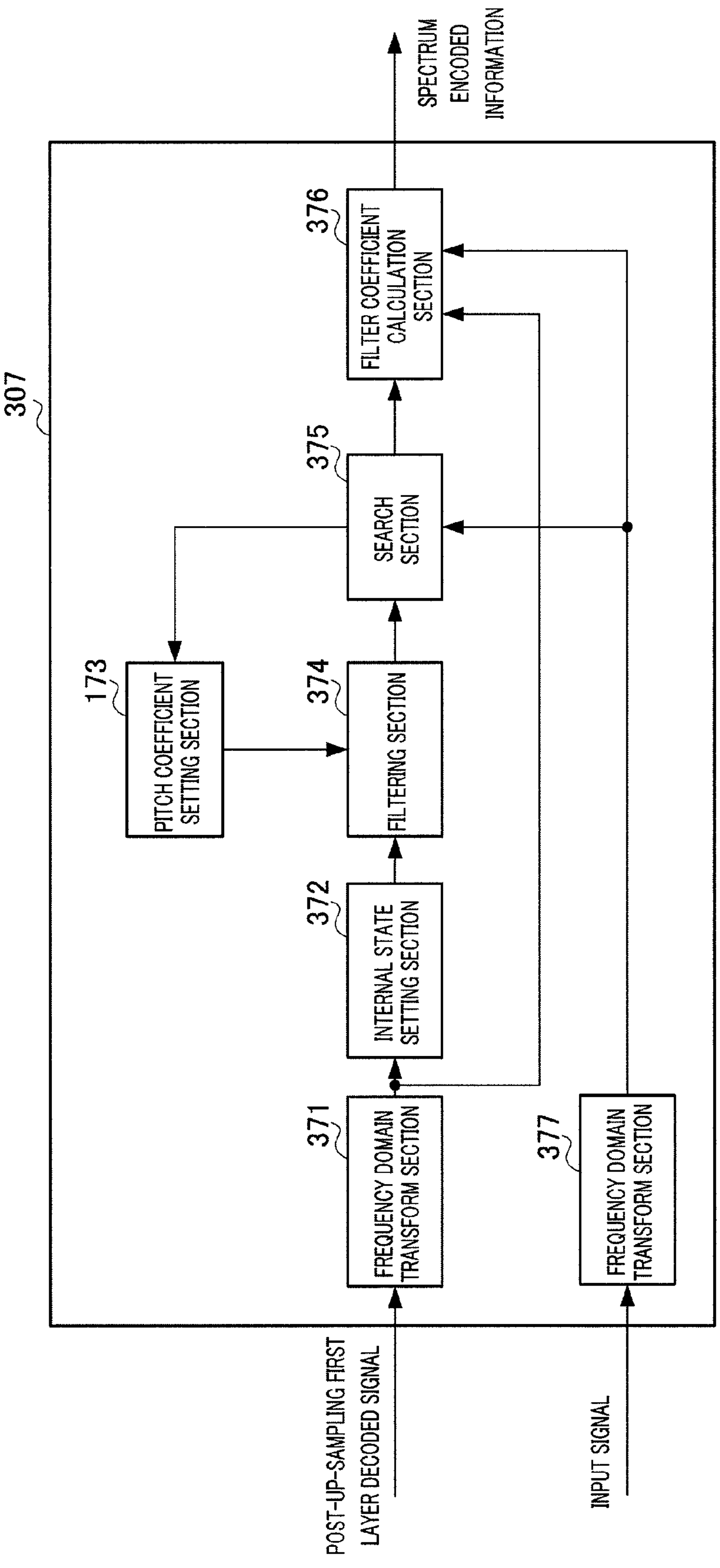
FIG. 15 is a block diagram showing the main configuration of the interior of a spectrum encoding section according to Embodiment 2 of the present invention.

FIG. 15 is a block diagram showing the main configuration of the interior of spectrum encoding section 307. Spectrum encoding section 307 has a similar basic configuration to that of spectrum encoding section 107 according to Embodiment 1 (see FIG. 3), and therefore identical configuration elements are assigned the same reference codes, and descriptions thereof are omitted here.

Spectrum encoding section 307 differs from spectrum encoding section 107 in being further equipped with frequency domain transform section 377. Processing differs in part between frequency domain transform section 371, internal state setting section 372, filtering section 374, search section 375, and filter coefficient calculation section 376 of spectrum encoding section 307 and frequency domain transform section 171, internal state setting section 172, filtering section 174, search section 175, and filter coefficient calculation section 176 of spectrum encoding section 107, and different reference codes are assigned to indicate this.

Frequency domain transform section 377 performs frequency transform on an input speech/audio signal with an effective frequency band of $0 \le k < FH$, to calculate input spectrum S(k). A discrete Fourier transform (DFT), discrete cosine transform (DCT), modified discrete cosine transform (MDCT), or the like, is used as a frequency transform method here.

Frequency domain transform section 371 performs frequency transform on a post-up-sampling first layer decoded signal with an effective frequency band of $0 \le k < FH$ input from up-sampling section 104, instead of a speech/audio signal with an effective frequency band of $0 \le k < FH$, to calculate first layer decoded spectrum $S_{DEC1}(k)$. A discrete Fourier transform (DFT), discrete cosine transform (DCT), modified discrete cosine transform (MDCT), or the like, is used as a frequency transform method here.

Internal state setting section 372 sets a filter internal state used by filtering section 374 using first layer decoded spectrum $S_{DEC1}(k)$ having an effective frequency band of $0 \le k < FH$, instead of input spectrum S(k) having an effective frequency band of $0 \le k < FH$. Except for the fact that first layer decoded spectrum $S_{DEC1}(k)$ is used instead of input spectrum S(k), this filter internal state setting is similar to the internal state setting performed by internal state setting section 172, and therefore a detailed description thereof is omitted here.

Filtering section 374 performs first layer decoded spectrum filtering using the filter internal state set by internal state setting section 372 and pitch coefficient T output from pitch coefficient setting section 173, to calculate first layer decoded spectrum estimated value $S_{DEC1}'(k)$. Except for the fact that Equation (8) below is used instead of Equation (2), this filtering processing is similar to the filtering processing performed by filtering section 174, and therefore a detailed description thereof is omitted here.

(Equation 8)

$$S_{DEC1}'(k)=S_{DEC1}(k-T) \quad [8]$$

Search section 375 calculates a degree of similarity that is a parameter indicating similarity between input spectrum S(k) input from frequency domain transform section 377 and first layer decoded spectrum estimated value $S_{DEC1}'(k)$ output from filtering section 374. Except for the fact that Equation (9) below is used instead of Equation (4), this degree of similarity calculation processing is similar to the degree of similarity calculation processing performed by search section 175, and therefore a detailed description thereof is omitted here.

[9]

$$A = \frac{\left(\sum_{k=FL}^{FH-1} S(k) \cdot S'_{DEC1}(k)\right)^2}{\sum_{k=FL}^{FH-1} S'_{DEC1}(k)^2} \quad \text{(Equation 9)}$$

This degree of similarity calculation processing is performed each time pitch coefficient T is provided to filtering section 374 from pitch coefficient setting section 173, and a pitch coefficient for which the calculated degree of similarity is a maximum—that is, optimum pitch coefficient T' (in the range Tmin to Tmax)—is provided to filter coefficient calculation section 376.

Filter coefficient calculation section 376 finds filter coefficient $\beta_i$ using optimum pitch coefficient T' provided from search section 375, input spectrum S(k) input from frequency domain transform section 377, and first layer decoded spectrum $S_{DEC1}(k)$ input from frequency domain transform section 371, and outputs filter coefficient $\beta_i$ and optimum pitch coefficient T' to multiplexing section 108 as spectrum encoded information. Except for the fact that Equation (10) below is used instead of Equation (5), filter coefficient $\beta_i$ calculation processing performed by filter coefficient calculation section 376 is similar to filter coefficient $\beta_i$ calculation processing performed by filter coefficient calculation section 176, and therefore a detailed description thereof is omitted here.

[10]

$$E = \sum_{k=FL}^{FH-1}\left(S(k) - \sum_{i=-1}^{1} \beta_i \cdot S_{DEC1}(k - T' - i)\right)^2 \quad \text{(Equation 10)}$$

In short, in encoding apparatus 300, spectrum encoding section 307 estimates the shape of a high-band ($FL \le k < FH$) of first layer decoded spectrum $S_{DEC1}(k)$ having an effective frequency band of $0 \le k < FH$ using filtering section 374 that makes first layer decoded spectrum $S_{DEC1}(k)$ having an effective frequency band of 0≤k<FH an internal state. By this means, encoding apparatus 300 finds parameters indicating a correlation between estimated value $S_{DEC1}'(k)$ for a high-band (FL≤k<FH) of first layer decoded spectrum $S_{DEC1}(k)$ and a high-band (FL≤k<FH) of input spectrum S(k)—that is, optimum pitch coefficient T' and filter coefficient $\beta_i$ representing filter characteristics of filtering section 374—and transmits these to a decoding apparatus instead of input spectrum high-band encoded information.

A decoding apparatus according to this embodiment has a similar configuration and performs similar operations to those of encoding apparatus 100 according to Embodiment 1, and therefore a detailed description thereof is omitted here.

Thus, according to this embodiment, on the decoding side lower layer and upper layer decoded spectra are added together, band enhancement of the obtained added spectrum is performed, and an optimum pitch coefficient and filter coefficient used when finding an added spectrum estimated value are found based on the correlation between first layer decoded spectrum estimated value $S_{DEC1}'(k)$ and a high-band (FL≤k<FH) of input spectrum S(k), rather than the correlation between input spectrum estimated value S'(k) and a high-band (FL≤k<FH) of input spectrum S(k). Consequently, the influence of encoding distortion in first layer encoding on decoding-side band enhancement can be suppressed, and decoded signal quality can be improved.

Embodiment 3

Figure 16:
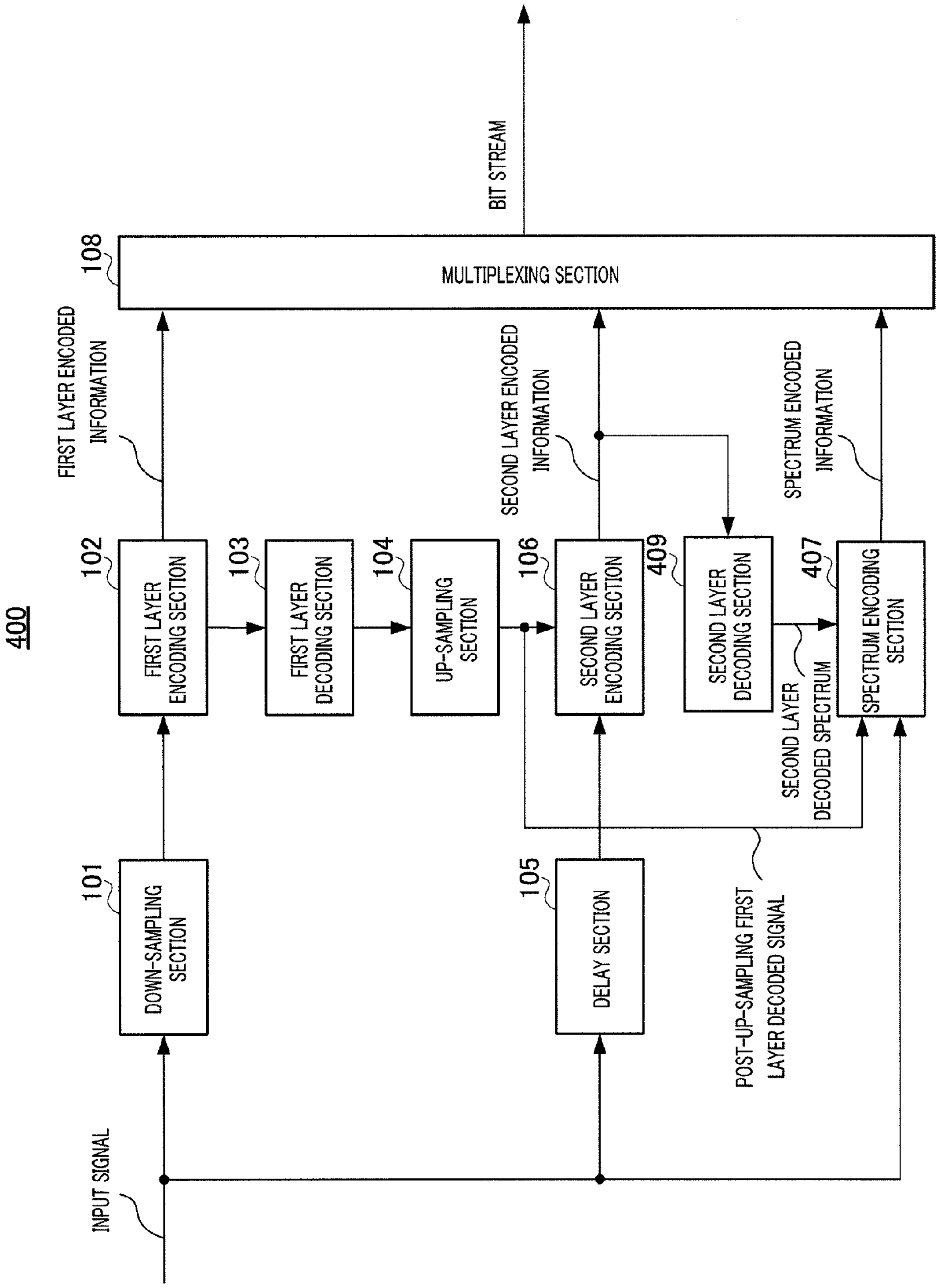
FIG. 16 is a block diagram showing the main configuration of an encoding apparatus according to Embodiment 3 of the present invention.

FIG. 16 is a block diagram showing the main configuration of encoding apparatus 400 according to Embodiment 3 of the present invention. Encoding apparatus 400 has a similar basic configuration to that of encoding apparatus 100 according to Embodiment 1 (see FIG. 1 through FIG. 3), and therefore identical configuration elements are assigned the same reference codes and descriptions thereof are omitted here.

Encoding apparatus 400 differs from encoding apparatus 100 in being further equipped with second layer decoding section 409. Processing differs in part between spectrum encoding section 407 of encoding apparatus 400 and spectrum encoding section 107 of encoding apparatus 100, and a different reference code is assigned to indicate this.

Second layer decoding section 409 has a similar configuration and performs similar operations to those of second layer decoding section 204 in decoding apparatus 200 according to Embodiment 1 (see FIGS. 8 through 10), and therefore a detailed description thereof is omitted here. However, whereas output of second layer decoding section 204 is called a second layer MDCT coefficient, output of second layer decoding section 409 here is called a second layer decoded spectrum, designated $S_{DEC2}(k)$.

Spectrum encoding section 407 transforms a speech/audio signal that is an encoding apparatus 400 input signal, and a post-up-sampling first layer decoded signal input from up-sampling section 104, to the frequency domain, and obtains an input spectrum and first layer decoded spectrum. Then spectrum encoding section 407 adds together a first layer decoded spectrum low-band component and a second layer decoded spectrum input from second layer decoding section 409, analyzes the correlation between an added spectrum that is the addition result and an input spectrum high-band component, calculates a parameter for performing band enhancement on the decoding side and estimating a high-band component from a low-band component, and outputs this to multiplexing section 108 as spectrum encoded information.

Figure 17:
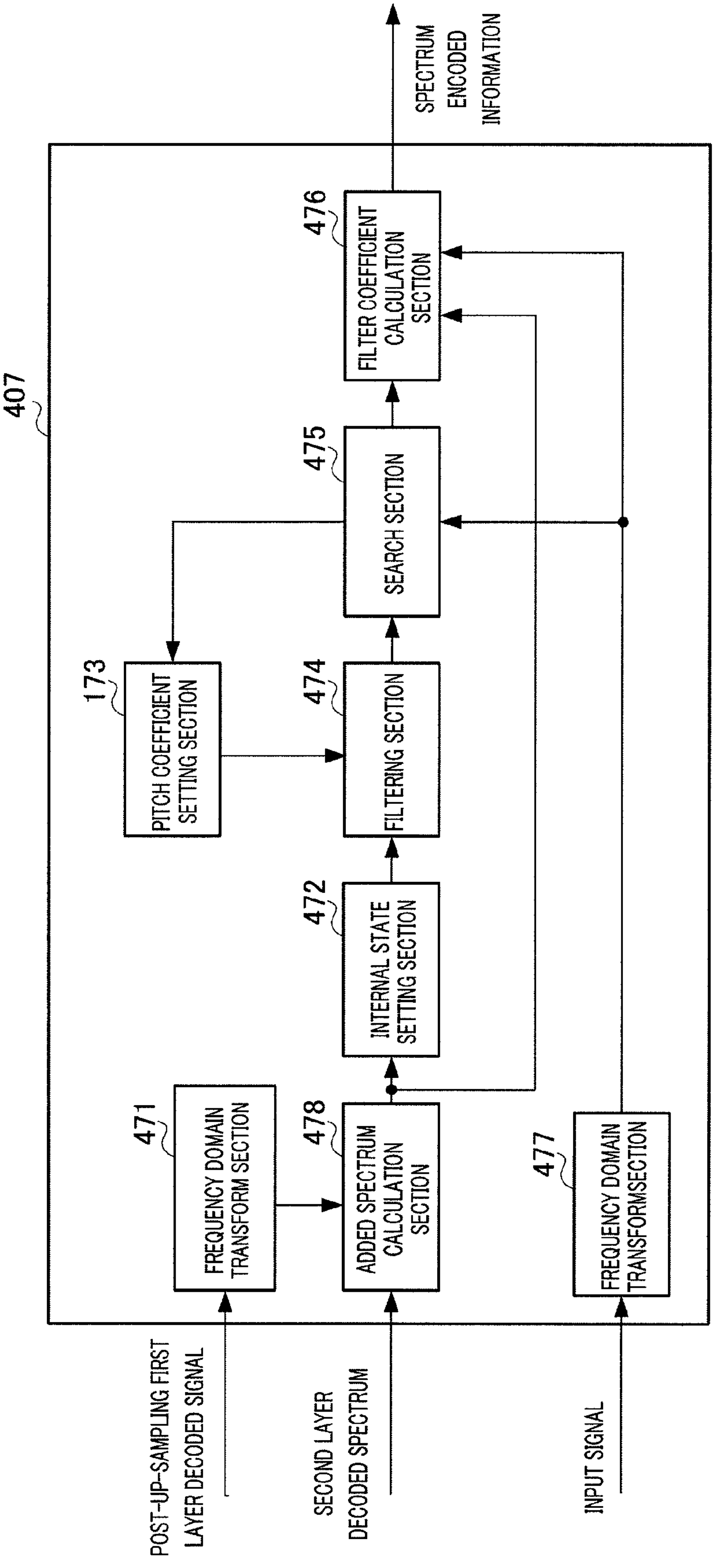
FIG. 17 is a block diagram showing the main configuration of the interior of a spectrum encoding section according to Embodiment 3 of the present invention.

FIG. 17 is a block diagram showing the main configuration of the interior of spectrum encoding section 407. Spectrum encoding section 407 has a similar basic configuration to that of spectrum encoding section 107 according to Embodiment 1 (see FIG. 3), and therefore identical configuration elements are assigned the same reference codes, and descriptions thereof are omitted here.

Spectrum encoding section 407 differs from spectrum encoding section 107 in being equipped with frequency domain transform sections 471 and 477 and added spectrum calculation section 478 instead of frequency domain transform section 171. Processing differs in part between internal state setting section 472, filtering section 474, search section 475, and filter coefficient calculation section 476 of spectrum encoding section 407 and internal state setting section 172, filtering section 174, search section 175, and filter coefficient calculation section 176 of spectrum encoding section 107, and different reference codes are assigned to indicate this.

Frequency domain transform section 471 performs frequency transform on a post-up-sampling first layer decoded signal with an effective frequency band of 0≤k<FH input from up-sampling section 104, instead of a speech/audio signal with an effective frequency band of 0≤k<FH, to calculate first layer decoded spectrum $S_{DEC1}(k)$ and outputs this to added spectrum calculation section 478. A discrete Fourier transform (DFT), discrete cosine transform (DCT), modified discrete cosine transform (MDCT), or the like, is used as a frequency transform method here.

Added spectrum calculation section 478 adds together a low-band (0≤k<FL) component of first layer decoded spectrum $S_{DEC1}(k)$ input from frequency domain transform section 471 and second layer decoded spectrum $S_{DEC2}(k)$ input from second layer decoding section 409, and outputs an obtained added spectrum $S_{SUM}(k)$ to internal state setting section 472. Here, the added spectrum $S_{SUM}(k)$ band is a band selected as a quantization target band by second layer encoding section 106, and therefore the added spectrum $S_{SUM}(k)$ band is composed of a low band (0≤k<FL) and a quantization target band selected by second layer encoding section 106.

Frequency domain transform section 477 performs frequency transform on an input speech/audio signal with an effective frequency band of 0≤k<FH, to calculate input spectrum S(k). A discrete Fourier transform (DFT), discrete cosine transform (DCT), modified discrete cosine transform (MDCT), or the like, is used as a frequency transform method here.

Internal state setting section 472 sets a filter internal state used by filtering section 474 using added spectrum $S_{SUM}(k)$ having an effective frequency band of 0≤k<FH, instead of input spectrum S(k) having an effective frequency band of 0≤k<FH. Except for the fact that added spectrum $S_{SUM}(k)$ is used instead of input spectrum S(k), this filter internal state setting is similar to the internal state setting performed by internal state setting section 172, and therefore a detailed description thereof is omitted here.

Filtering section 474 performs added spectrum $S_{SUM}(k)$ filtering using the filter internal state set by internal state setting section 472 and pitch coefficient T output from pitch coefficient setting section 473, to calculate added spectrum estimated value $S_{SUM}'(k)$. Except for the fact that Equation (11) below is used instead of Equation (2), this filtering processing is similar to the filtering processing performed by filtering section 174, and therefore a detailed description thereof is omitted here.

(Equation 11)

$$S_{SUM}'(k)=S_{SUM}(k-T) \qquad [11]$$

Search section 475 calculates a degree of similarity that is a parameter indicating similarity between input spectrum S(k) input from frequency domain transform section 477 and added spectrum estimated value $S_{SUM}'(k)$ output from filtering section 474. Except for the fact that Equation (12) below is used instead of Equation (4), this degree of similarity calculation processing is similar to the degree of similarity calculation processing performed by search section 175, and therefore a detailed description thereof is omitted here.

[12]

$$A = \frac{\left(\sum_{k=FL}^{FH-1} S(k) \cdot S'_{SUM}(k)\right)^2}{\sum_{k=FL}^{FH-1} S'_{SUM}(k)^2} \quad \text{(Equation 12)}$$

This degree of similarity calculation processing is performed each time pitch coefficient T is provided to filtering section 474 from pitch coefficient setting section 173, and a pitch coefficient for which the calculated degree of similarity is a maximum—that is, optimum pitch coefficient T' (in the range Tmin to Tmax)—is provided to filter coefficient calculation section 476.

Filter coefficient calculation section 476 finds filter coefficient $\beta_i$ using optimum pitch coefficient T' provided from search section 475, input spectrum S(k) input from frequency domain transform section 477, and added spectrum $S_{SUM}(k)$ input from added spectrum calculation section 478, and outputs filter coefficient $\beta_i$ and optimum pitch coefficient T' to multiplexing section 108 as spectrum encoded information. Except for the fact that Equation (13) below is used instead of Equation (5), filter coefficient $\beta_i$ calculation processing performed by filter coefficient calculation section 476 is similar to filter coefficient $\beta_i$ calculation processing performed by filter coefficient calculation section 176, and therefore a detailed description thereof is omitted here.

[13]

$$E = \sum_{k=FL}^{FH-1} \left(S(k) - \sum_{i=-1}^{1} \beta_i \cdot S_{SUM}(k - T' - i)\right)^2 \quad \text{(Equation 13)}$$

In short, in encoding apparatus 400, spectrum encoding section 407 estimates the shape of a high-band (FL≤k<FH) of added spectrum $S_{SUM}(k)$ having an effective frequency band of 0≤k<FH using filtering section 474 that makes added spectrum $S_{SUM}(k)$ having an effective frequency band of 0≤k<FH an internal state. By this means, encoding apparatus 400 finds parameters indicating a correlation between estimated value $S_{SUM}'(k)$ for a high-band (FL≤k<FH) of added spectrum $S_{SUM}(k)$ and a high-band (FL≤k<FH) of input spectrum S(k)—that is, optimum pitch coefficient T' and filter coefficient $\beta_i$ representing filter characteristics of filtering section 474—and transmits these to a decoding apparatus instead of input spectrum high-band encoded information.

A decoding apparatus according to this embodiment has a similar configuration and performs similar operations to those of decoding apparatus 200 according to Embodiment 1, and therefore a detailed description thereof is omitted here.

Thus, according to this embodiment, on the encoding side an added spectrum is calculated by adding together a first layer decoded spectrum and second layer decoded spectrum, and an optimum pitch coefficient and filter coefficient are found based on the correlation between the added spectrum and input spectrum. On the decoding side, an added spectrum is calculated by adding together lower layer and upper layer decoded spectra, and band enhancement is performed to find an added spectrum estimated value using the optimum pitch coefficient and filter coefficient transmitted from the encoding side. Consequently, the influence of encoding distortion in first layer encoding and second layer encoding on decoding-side band enhancement can be suppressed, and decoded signal quality can be further improved.

In this embodiment, a case has been described by way of example in which an added spectrum is calculated by adding together a first layer decoded spectrum and second layer decoded spectrum, and an optimum pitch coefficient and filter coefficient used in band enhancement by a decoding apparatus are calculated based on the correlation between the added spectrum and input spectrum, but the present invention is not limited to this, and a configuration may also be used in which either the added spectrum or the first decoded spectrum is selected as the spectrum for which correlation with the input spectrum is found. For example, if emphasis is placed on the quality of the first layer decoded signal, an optimum pitch coefficient and filter coefficient for band enhancement can be calculated based on the correlation between the first layer decoded spectrum and input spectrum, whereas if emphasis is placed on the quality of the second layer decoded signal, an optimum pitch coefficient and filter coefficient for band enhancement can be calculated based on the correlation between the added spectrum and input spectrum. Supplementary information input to the encoding apparatus, or the channel state (transmission speed, band, and so forth), can be used as a selection condition, and if, for example, channel utilization efficiency is extremely high and only first layer encoded information can be transmitted, a higher-quality output signal can be provided by calculating an optimum pitch coefficient and filter coefficient for band enhancement based on the correlation between the first decoded spectrum and input spectrum.

As described above, to calculate the optimum pitch coefficient and filter coefficient depending on cases, additionally, the correlation between an input spectrum low-band component and high-band component may also be found as described in Embodiment 1. For example, if distortion between a first layer decoded spectrum and input spectrum is extremely small, a higher-quality output signal can be provided the higher the layer is by calculating an optimum pitch coefficient and filter coefficient from an input spectrum low-band component and high-band component.

This concludes a description of embodiments of the present invention.

As described in the above embodiments, according to the present invention, in a scalable codec, an advantageous effect can be provided by differently configuring a low-band component of a first layer decoded signal used when calculating a band enhancement parameter, or a calculated signal calculated using a first layer decoded signal (for example, an addition signal resulting from adding together a first layer decoded signal and second layer decoded signal), in an encoding apparatus, and a low-band component of a first layer decoded signal that applies a band enhancement parameter for band enhancement, or a calculated signal calculated using a first layer decoded signal (for example, an addition signal resulting from adding together a first layer decoded signal and second layer decoded signal), in a decoding apparatus. It is also possible to provide a configuration such that these low-band components are made mutually identical, or a configuration such that an input signal low-band component is used in an encoding apparatus.

In the above embodiments, examples have been shown in which a pitch coefficient and filter coefficient are used as parameters used for band enhancement, but the present invention is not limited to this. For example, provision may be made for one coefficient to be fixed on the encoding side and the decoding side, and only the other coefficient to be transmitted from the encoding side as a parameter. Alternatively, a parameter to be used for transmission may be found separately based on these coefficients, and that may be taken as a band enhancement parameter, or these may be used in combination.

In the above embodiments, an encoding apparatus may have a function of calculating and encoding gain information for adjusting energy for each high-band subband after filtering (each band resulting from dividing the entire band into a plurality of bands in the frequency domain), and a decoding apparatus may receive this gain information and use it in band enhancement. That is to say, it is possible for gain information used for per-subband energy adjustment obtained by the encoding apparatus as a parameter to be used for performing band enhancement to be transmitted to the decoding apparatus, and for this gain information to be applied to band enhancement by the decoding apparatus. For example, as the simplest band enhancement method, it is possible to use only gain information that adjusts per-subband energy as a parameter for band enhancement by fixing a pitch coefficient and filter coefficient for estimating a high-band spectrum from a low-band spectrum in the encoding apparatus and decoding apparatus beforehand. Therefore, band enhancement can be performed by using at least one of three kinds of information: a pitch coefficient, a filter coefficient, and gain information.

An encoding apparatus, decoding apparatus, and method thereof according to the present invention are not limited to the above-described embodiments, and various variations and modifications may be possible without departing from the scope of the present invention. For example, it is possible for embodiments to be implemented by being combined appropriately.

It is possible for an encoding apparatus and decoding apparatus according to the present invention to be installed in a communication terminal apparatus and base station apparatus in a mobile communication system, thereby enabling a communication terminal apparatus, base station apparatus, and mobile communication system that have the same kind of operational effects as described above to be provided.

A case has here been described by way of example in which the present invention is configured as hardware, but it is also possible for the present invention to be implemented by software. For example, the same kind of functions as those of an encoding apparatus and decoding apparatus according to the present invention can be realized by writing an algorithm of an encoding method and decoding method according to the present invention in a programming language, storing this program in memory, and having it executed by an information processing means.

The function blocks used in the descriptions of the above embodiments are typically implemented as LSIs, which are integrated circuits. These may be implemented individually as single chips, or a single chip may incorporate some or all of them.

Here, the term LSI has been used, but the terms IC, system LSI, super LSI, ultra LSI, and so forth may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

An encoding apparatus and decoding apparatus of the present invention can be summarized in a representative manner as follows.

A first aspect of the present invention is an encoding apparatus having: a first encoding section that encodes part of a low band that is a band lower than a predetermined frequency within an input signal to generate first encoded data; a first decoding section that decodes the first encoded data to generate a first decoded signal; a second encoding section that encodes a predetermined band part of a residual signal of the input signal and the first decoded signal to generate second encoded data; and a filtering section that filters part of the low band of the first decoded signal or a calculated signal calculated using the first decoded signal, to obtain a band enhancement parameter for obtaining part of a high band that is a band higher than the predetermined frequency of the input signal.

A second aspect of the present invention is an encoding apparatus further having, in the first aspect: a second decoding section that decodes the second encoded data to generate a second decoded signal; and an addition section that adds together the first decoded signal and the second decoded signal to generate an addition signal; wherein the filtering section applies the addition signal as the calculated signal, filters part of the low band of the addition signal, to obtain the band enhancement parameter for obtaining part of a high band that is a band higher than the predetermined frequency of the input signal.

A third aspect of the present invention is an encoding apparatus further having, in the first or second aspect, a gain information generation section that calculates gain information that adjusts per-subband energy after the filtering.

A fourth aspect of the present invention is a decoding apparatus that uses a scalable codec with an r-layer configuration (where r is an integer of 2 or more), and has: a receiving section that receives a band enhancement parameter calculated using an m'th-layer decoded signal (where m is an integer less than or equal to r) in an encoding apparatus; and a decoding section that generates a high-band component by using the band enhancement parameter on a low-band component of an n'th-layer decoded signal (where n is an integer less than or equal to r).

A fifth aspect of the present invention is a decoding apparatus wherein, in the fourth aspect, the decoding section generates a high-band component of a decoded signal of an n'th layer different from an m'th layer (where $m \neq n$) using the band enhancement parameter.

A sixth aspect of the present invention is a decoding apparatus wherein, in the fourth or fifth aspect, the receiving section further receives gain information transmitted from the encoding apparatus, and the decoding section generates a high-band component of the n'th layer decoded signal using the gain information instead of the band enhancement parameter, or using the band enhancement parameter and the gain information.

A seventh aspect of the present invention is a decoding apparatus having: a receiving section that receives, transmitted from an encoding apparatus, first encoded data in which is encoded part of a low band that is a band lower than a predetermined frequency within an input signal in the encoding apparatus, second encoded data in which is encoded a predetermined band part of a residue of a first decoded spectrum obtained by decoding the first encoded data and a spectrum of the input signal, and a band enhancement parameter for obtaining part of a high band that is a band higher than the predetermined frequency of the input signal by filtering part of the low band of the first decoded spectrum or a first added spectrum resulting from adding together the first decoded spectrum and a second decoded spectrum obtained by decoding the second encoded data; a first decoding section that decodes the first encoded data to generate a third decoded spectrum in the low band; a second decoding section that decodes the second encoded data to generate a fourth decoded spectrum in the predetermined band part; and a third decoding section that decodes a band part not decoded by the first decoding section or the second decoding section by performing band enhancement of one or another of the third decoded spectrum, the fourth decoded spectrum, and a fifth decoded spectrum generated using both of these, using the band enhancement parameter.

An eighth aspect of the present invention is a decoding apparatus wherein, in the seventh aspect, the receiving section receives the first encoded data, the second encoded data, and the band enhancement parameter for obtaining part of a high band that is a band higher than the predetermined frequency of the input signal by filtering part of the low band of the first added spectrum.

A ninth aspect of the present invention is a decoding apparatus wherein, in the seventh aspect, the third decoding section has: an addition section that adds together the third decoded spectrum and the fourth decoded spectrum to generate a second added spectrum; and a filtering section that performs the band enhancement by filtering the third decoded spectrum, the fourth decoded spectrum, or the second added spectrum as the fifth decoded spectrum, using the band enhancement parameter.

A tenth aspect of the present invention is a decoding apparatus wherein, in the seventh aspect, the receiving section further receives gain information transmitted from the encoding apparatus; and the third decoding section decodes a band part not decoded by the first decoding section or the second decoding section by performing band enhancement of one or another of the third decoded spectrum, the fourth decoded spectrum, and a fifth decoded spectrum generated using both of these, using the gain information instead of the band enhancement parameter, or using the band enhancement parameter and the gain information.

An eleventh aspect of the present invention is an encoding apparatus/decoding apparatus wherein, in the tenth aspect, the band enhancement parameter includes at least one of a pitch coefficient and a filter coefficient.

The disclosures of Japanese Patent Application No. 2006-338341, filed on Dec. 15, 2006, and Japanese Patent Application No. 2007-053496, filed on Mar. 2, 2007, including the specifications, drawings and abstracts, are incorporated herein by reference in their entirety.

INDUSTRIAL APPLICABILITY

An encoding apparatus and so forth according to the present invention is suitable for use in a communication terminal apparatus, base station apparatus, or the like, in a mobile communication system.

The invention claimed is:

1. An encoding apparatus comprising:

a processor, the processor comprising:

a first encoder that encodes a portion in a low band of an input speech/audio signal to generate first encoded data, the low band being a band lower than a predetermined frequency;

a first decoder that decodes the first encoded data to generate a first decoded signal;

a second encoder that encodes a predetermined band portion of a residual signal calculated from the input speech/audio signal and the first decoded signal, to generate second encoded data; and a filter that filters a portion in the low band of the first decoded signal or of a calculated signal calculated using the first decoded signal, to obtain a band enhancement parameter for obtaining a portion in a high band of the input speech/audio signal, the high band being a band higher than the predetermined frequency.

2. The encoding apparatus according to claim 1, further comprising:

a second decoder that decodes the second encoded data to generate a second decoded signal; and an adder that adds together the first decoded signal and the second decoded signal to generate an addition signal, wherein the filter uses the addition signal as the calculated signal, filters a portion in the low band of the addition signal, to obtain the band enhancement parameter for obtaining the portion of the input speech/audio signal in the high band.

3. The encoding apparatus according to claim 1, further comprising a gain information generator that calculates gain information that adjusts per-subband energy after the filtering.

4. The encoding apparatus according to claim 1, wherein the band enhancement parameter includes at least one of a pitch coefficient and a filter coefficient.

5. The encoding apparatus according to claim 2, further comprising a gain information generator that calculates gain information that adjusts per-subband energy after the filtering.

6. The encoding apparatus according to claim 2, wherein the band enhancement parameter includes at least one of a pitch coefficient and a filter coefficient.

7. The encoding apparatus according to claim 3, wherein the band enhancement parameter includes at least one of a pitch coefficient and a filter coefficient.

8. A decoding apparatus that uses a scalable codec with an r-layer configuration (where r is an integer of 2 or more), the decoding apparatus comprising:

a processor, the processor comprising:

a receiver that receives a band enhancement parameter calculated using an m'th-layer decoded speech/audio signal (where m is an integer less than or equal to r) in an encoding apparatus; and a decoder that generates a high-band component using the band enhancement parameter and a low-band component of an n'th-layer decoded speech/audio signal (where n is an integer less than or equal to r), wherein the decoder generates a high-band component of a decoded signal of an n'th layer different from an m'th layer (where $m \neq n$) using the band enhancement parameter.

9. The decoding apparatus according to claim 8, wherein:

the receiver further receives gain information transmitted from the encoding apparatus; and the decoder generates the high-band component of the n'th-layer decoded speech/audio signal using the gain information instead of the band enhancement parameter, or using the band enhancement parameter and the gain information.

10. The decoding apparatus according to claim 8, wherein the band enhancement parameter includes at least one of a pitch coefficient and a filter coefficient.

11. A decoding apparatus comprising:

a processor, the processor comprising:

a receiver that receives, transmitted from an encoding apparatus, first encoded data in which a portion in a low band of an input speech/audio signal to the encoding apparatus is encoded, the low band being a band lower than a predetermined frequency; second encoded data in which a predetermined band portion of a residue of a first decoded spectrum is encoded, the residue being obtained by decoding the first encoded data and a spectrum of the input speech/audio signal; and a band enhancement parameter for obtaining a portion in a high band of the input speech/audio signal, which is a band higher than the predetermined frequency, the band enhancement parameter being acquired by filtering a portion in the low band of the first decoded spectrum or of a first added spectrum resulting from adding together the first decoded spectrum and a second decoded spectrum obtained by decoding the second encoded data;

a first decoder that decodes the first encoded data to generate a third decoded spectrum in the low band;

a second decoder that decodes the second encoded data to generate a fourth decoded spectrum in the predetermined band portion; and a third decoder that decodes a band portion not decoded by the first decoder or the second decoder by performing band enhancement of one of the third decoded spectrum, the fourth decoded spectrum, and a fifth decoded spectrum using the band enhancement parameter, the fifth decoded spectrum being generated using both of the third decoded spectrum and the fourth decoded spectrum.

12. The decoding apparatus according to claim 11, wherein the receiver receives the first encoded data, the second encoded data, and the band enhancement parameter for obtaining the portion in the high band of the input speech/audio signal acquired by filtering the portion in the low band of the first added spectrum.

13. The decoding apparatus according to claim 11, wherein the third decoder comprises:

an adder that adds together the third decoded spectrum and the fourth decoded spectrum to generate a second added spectrum; and a filter that performs the band enhancement by filtering the third decoded spectrum, the fourth decoded spectrum, or the second added spectrum as the fifth decoded spectrum, using the band enhancement parameter.

14. The decoding apparatus according to claim 11, wherein:

the receiver further receives gain information transmitted from the encoding apparatus; and the third decoder decodes a band portion not decoded by the first decoder or the second decoder by performing band enhancement of one of the third decoded spectrum, the fourth decoded spectrum, and a fifth decoded spectrum using the gain information instead of the band enhancement parameter, or using the band enhancement parameter and the gain information, the fifth decoded spectrum being generated using both of the third decoded spectrum and the fourth decoded spectrum.

15. An encoding method comprising:

encoding, by a processor, a portion in a low band of an input speech/audio signal to generate first encoded data, the low band being a band lower than a predetermined frequency;

decoding, by a processor, the first encoded data to generate a first decoded signal;

encoding, by a processor, a predetermined band portion of a residual signal calculated from the input speech/audio signal and the first decoded signal, to generate second encoded data; and filtering, by a processor, a portion in the low band of the first decoded signal or of a calculated signal calculated using the first decoded signal, to obtain a band enhancement parameter for obtaining a portion in a high band of the input speech/audio signal, the high band being a band higher than the predetermined frequency.

16. A decoding method that uses a scalable codec with an r-layer configuration (where r is an integer of 2 or more), the decoding method comprising:

receiving, by a processor, a band enhancement parameter calculated using an m'th-layer decoded speech/audio signal (where m is an integer less than or equal to r) in an encoding apparatus; and generating, by a processor, a high-band component using the band enhancement parameter and a low-band component of an n'th-layer decoded speech/audio signal (where n is an integer less than or equal to r), wherein generating the high-band component generates a high-band component of a decoded signal of an n'th layer different from an m'th layer (where m≠n) using the band enhancement parameter.

17. A decoding method comprising:

receiving, by a processor, transmitted from an encoding apparatus, first encoded data in which a portion in a low band of an input speech/audio signal to the encoding apparatus is encoded, the low band being a band lower than a predetermined frequency; second encoded data in which a predetermined band portion of a residue of a first decoded spectrum is encoded, the residue being obtained by decoding the first encoded data and a spectrum of the input speech/audio signal; and a band enhancement parameter for obtaining a portion in a high band of the input speech/audio signal, which is a band higher than the predetermined frequency, the band enhancement parameter being acquired by filtering a portion in the low band of the first decoded spectrum or of a first added spectrum resulting from adding together the first decoded spectrum and a second decoded spectrum obtained by decoding the second encoded data;

decoding, by a processor, the first encoded data to generate a third decoded spectrum in the low band;

decoding, by a processor, the second encoded data to generate a fourth decoded spectrum in the predetermined band portion; and decoding, by a processor, a band portion not decoded by the decoding of the first encoded data or the decoding of the second encoded data, by performing band enhancement of one of the third decoded spectrum, the fourth decoded spectrum, and a fifth decoded spectrum using the band enhancement parameter, the fifth decoded spectrum being generated using both of the third decoded spectrum and the fourth decoded spectrum.

* * * * *